US012675639B1

(12) United States Patent
Mogill

(10) Patent No.: US 12,675,639 B1
(45) Date of Patent: Jul. 7, 2026

(54) SYSTEMS AND METHOD FOR LARGE LANGUAGE MODEL-BASED DIFFERENTIATION

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/359,058

(22) Filed: Oct. 15, 2025

(51) Int. Cl.
*G06F 40/30* (2020.01)
*G06F 16/353* (2025.01)
(Continued)

(52) U.S. Cl.
CPC ............ *G06F 40/30* (2020.01); *G06F 16/353* (2019.01); *G06F 16/358* (2019.01); *G06F 16/951* (2019.01)

(58) Field of Classification Search
CPC .......... G06N 20/10; G06N 7/01; G06N 20/20; G06N 3/045; G06N 3/0464; G06N 3/09; G06N 3/091; G06N 3/092; G06N 3/094; G06N 3/096; G06N 3/098; G06N 3/0985; G06N 7/023; G06N 7/02; G06N 7/026; G06N 20/00; G06N 3/0895; G06N 3/088; G06N 3/086; G06N 3/084; G06N 3/082; G06N 3/08; G06N 3/047; G06N 3/0475; G06N 3/048; G06N 3/049; G06N 3/04; G06N 3/0409; G06N 3/0418; G06N 3/042; G06N 3/043; G06N 3/044; G06N 3/0442; G06F 16/43; G06F 16/953; G06F 18/2185; G06F 16/3344; G06F 40/00; G06F 40/10; G06F 40/20; G06F 40/253;

G06F 40/274; G06F 40/279; G06F 40/284; G06F 40/289; G06F 40/295; G06F 40/35; G06F 40/58
See application file for complete search history.

(56) References Cited

U.S. PATENT DOCUMENTS 10,740,716 B1 * 8/2020 Souliotis .......... G06Q 10/08355
11,227,691 B2 * 1/2022 Neumann .............. G06N 20/00
(Continued)

OTHER PUBLICATIONS

Shazeer, Noam, et al. "Outrageously large neural networks: The sparsely-gated mixture-of-experts layer." arXiv preprint arXiv: 1701. 06538 (2017). (Year: 2017).*

(Continued)

*Primary Examiner* — Edgar X Guerra-Erazo
(74) *Attorney, Agent, or Firm* — CALDWELL LLC

(57) ABSTRACT

A system for Large Language Model (LLM) based differentiation, the system including a processor configured to receive input data associated with an entity, classify the input data to a descriptive class, command an adaptive web crawler to retrieve descriptive content associated with the descriptive class, extract a plurality of positioning signals from the input data associated with the entity, generate a contrast score for each positioning signal of the plurality of positioning signals by comparing the plurality of positioning signals to the descriptive content, encode the contrast score into a differentiator profile including at least one categorical tag and at least one weighted relationship for each positioning signal, modify a generation behavior of a base LLM using the differentiator profile as a conditioning input and generate, by the base LLM conditioned on the differentiator profile, one or more differentiator outputs.

20 Claims, 8 Drawing Sheets

(51) Int. Cl.
   *G06F 16/358* (2025.01)
   *G06F 16/951* (2019.01)

(56) References Cited

U.S. PATENT DOCUMENTS

| | | | | |
|---|---|---|---|---|
| 11,914,674 | B2 * | 2/2024 | Zadeh | G06N 3/044 |
| 12,026,626 | B1 * | 7/2024 | Pardeshi | G06N 3/048 |
| 12,353,469 | B1 * | 7/2025 | Mahabadi | G06F 16/332 |
| 2004/0249697 | A1 | 12/2004 | Ohnemus et al. | |
| 2017/0316775 | A1 * | 11/2017 | Le | G06F 16/3329 |
| 2019/0377791 | A1 * | 12/2019 | Abou Mahmoud | G06F 40/226 |
| 2020/0065857 | A1 | 2/2020 | Lagi et al. | |
| 2020/0302231 | A1 * | 9/2020 | Nawhal | G06N 3/0475 |
| 2021/0065907 | A1 * | 3/2021 | Neumann | G16H 20/00 |
| 2022/0121884 | A1 * | 4/2022 | Zadeh | G06N 3/006 |
| 2022/0164520 | A1 * | 5/2022 | Dolan | G06F 3/04842 |
| 2023/0214679 | A1 | 7/2023 | Xu et al. | |
| 2025/0061307 | A1 * | 2/2025 | Tran | G06N 3/045 |
| 2025/0094511 | A1 * | 3/2025 | Badr | G06F 40/20 |
| 2025/0123814 | A1 * | 4/2025 | McMorran | G06N 3/044 |
| 2025/0124236 | A1 * | 4/2025 | Gupta | G06F 40/103 |
| 2025/0139564 | A1 * | 5/2025 | Barrie | G06Q 10/067 |
| 2025/0217603 | A1 * | 7/2025 | Mangalam | G06F 40/284 |
| 2025/0238458 | A1 * | 7/2025 | Ryland | G06F 16/367 |

OTHER PUBLICATIONS

A. Ghosh and K. Deepa, "QueryMintAI: Multipurpose Multimodal Large Language Models for Personal Data," in IEEE Access, vol. 12, p. 144631-144651, 2024. (Year: 2024).*

* cited by examiner

200

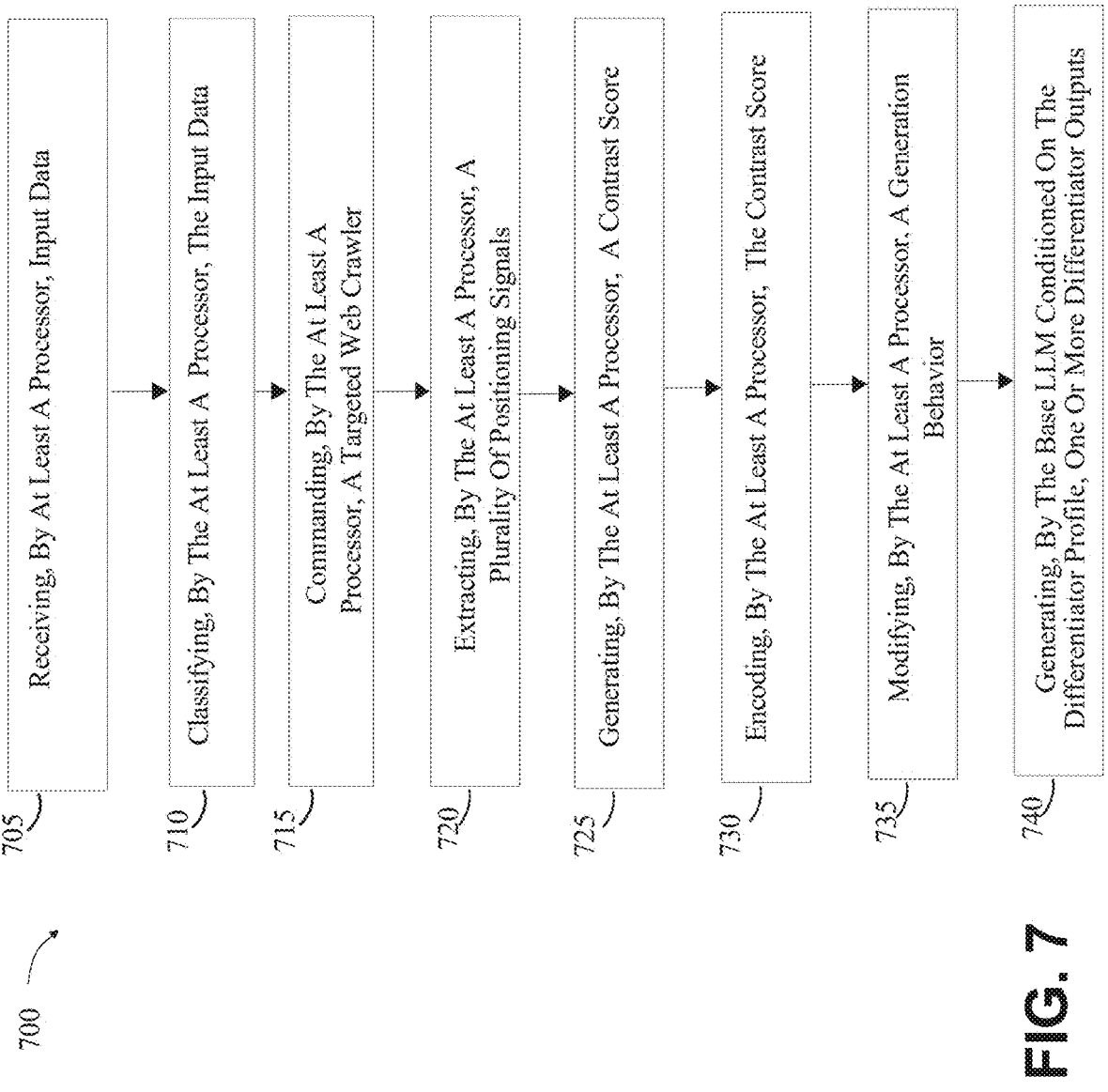

700

705  Receiving, By At Least A Processor, Input Data

710  Classifying, By The At Least A Processor, The Input Data

715  Commanding, By The At Least A Processor, A Targeted Web Crawler

720  Extracting, By The At Least A Processor, A Plurality Of Positioning Signals 725  Generating, By The At Least A Processor, A Contrast Score 730  Encoding, By The At Least A Processor, The Contrast Score 735  Modifying, By The At Least A Processor, A Generation Behavior 740  Generating, By The Base LLM Conditioned On The Differentiator Profile, One Or More Differentiator Outputs

FIG. 7

SYSTEMS AND METHOD FOR LARGE LANGUAGE MODEL-BASED DIFFERENTIATION

FIELD OF THE INVENTION

The present invention generally relates to the field of large language models. In particular, the present invention is directed to systems and methods for large language model-based differentiation.

BACKGROUND

Conventional LLM (large language model) customization are primarily conditioned on first-party inputs from the target entity. Such customization does not compute cohort-aware contrastive signals that quantify how an entity's attributes differ from peers, nor do they estimate a signed benefit indicating whether a distinctive factor is favorable or detrimental for the intended audience. Consequently, so-called customization systems fails to deliver actual customization, and the resulting outputs are inaccurate or misaligned.

SUMMARY OF THE DISCLOSURE

In an aspect, a system for Large Language Model (LLM) based differentiation is described. The system includes a processor and a memory communicatively connected to the processor. The memory contains instructions configuring the processor to receive input data associated with an entity, classify the input data to a descriptive class, command an adaptive web crawler to retrieve descriptive content associated with the descriptive class, extract a plurality of positioning signals from the input data associated with the entity, generate a contrast score for each positioning signal of the plurality of positioning signals by comparing the plurality of positioning signals to the descriptive content, encode the contrast score into a differentiator profile including at least one categorical tag and at least one weighted relationship for each positioning signal, modify a generation behavior of a base LLM using the differentiator profile as a conditioning input and generate, by the base LLM conditioned on the differentiator profile, one or more differentiator outputs.

In another aspect, a method for Large Language Model (LLM) based differentiation is described. The method includes receiving, by at least a processor, input data associated with an entity, classifying, by the at least a processor, the input data to a descriptive class, commanding, by the at least a processor, an adaptive web crawler to retrieve descriptive content associated with the descriptive class, extracting, by the at least a processor, a plurality of positioning signals from the input data associated with the entity, generating, by the at least a processor, a contrast score for each positioning signal of the plurality of positioning signals by comparing the plurality of positioning signals to the descriptive content, encoding, by the at least a processor, the contrast score into a differentiator profile including at least one categorical tag and at least one weighted relationship for each positioning signal, modifying, by the at least a processor, a generation behavior of a base LLM using the differentiator profile as a conditioning input and generating, by the base LLM conditioned on the differentiator profile, one or more differentiator outputs.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a flow diagram illustrating an exemplary embodiment of a method for large language model-based differentiation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for LLM-based differentiation. In one or more embodiments, aspects of the present disclosure may utilize class-targeted or adaptive web crawling, contrastive profiling, and profile-conditioned generation. In an embodiment, a computing device receives input data associated with an entity, classifies the input to a descriptive class, commands an adaptive web crawler to retrieve class-specific descriptive content, extracts positioning signals from the entity data, computes a contrast score for each positioning signal by comparing it to the class corpus, encodes the scores into a differentiator profile having categorical tags and weighted relationships, and modifies the generation behavior of a base LLM using the differentiator profile as a conditioning input to generate differentiator outputs.

Aspects of the present disclosure can be used to automatically identify and formalize entity-specific differentiators and to generate market-ready messaging (e.g., headlines, value propositions, proof-led statements) that reflect those differentiators. Aspects of the present disclosure can also be used to monitor and adapt to competitive changes by refreshing the descriptive class corpus, recomputing contrast scores, and updating the differentiator profile used to condition the LLM. This is so, at least in part, because the disclosed system computes cohort-aware, embedding-space comparisons between the entity's positioning signals and competitor content so the LLM is conditioned on discriminative, evidence-linked guidance rather than undifferentiated inputs, thereby producing more accurate, specific, and consistent outputs.

Aspects of the present disclosure allow for computer-implemented personalization of an LLM that is contrast-sensitive and profile-driven, improving output accuracy by constraining generation to validated signals encoded in the differentiator profile and reducing generic, competitor-convergent language. Exemplary embodiments illustrating aspects of the present disclosure are described below in the context of several specific examples.

Figure 1:
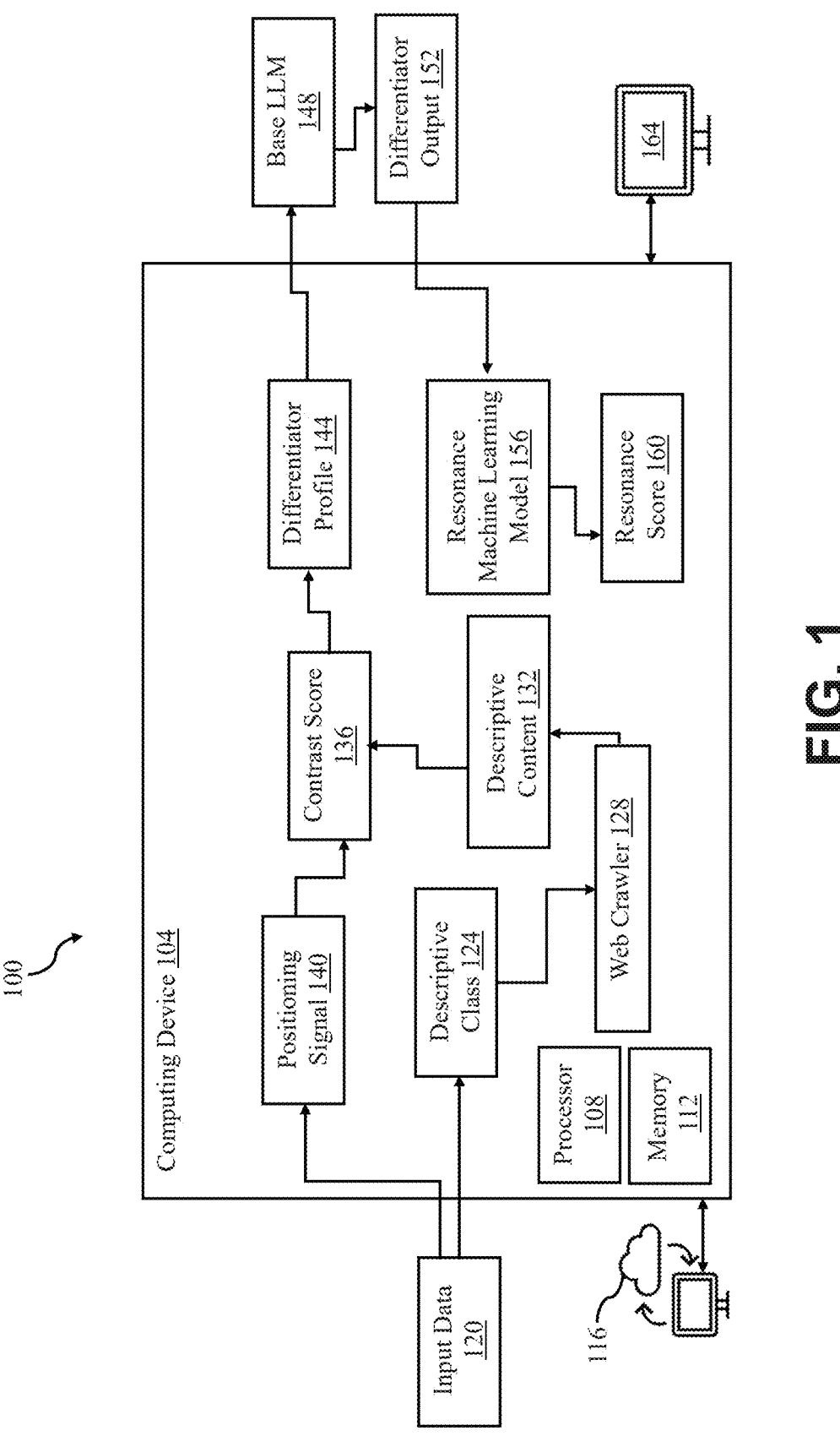
FIG. 1 is a block diagram illustrating an exemplary embodiment of a system for large language model-based differentiation.

Referring now to FIG. 1, a system 100 for large language model-based differentiation is described. In one or more embodiments, system 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/ arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, system 100 may include a database 116. Database may include a remote database. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. In one or more embodiments, database may include a remote database. A "remote database" as described in this disclosure is a is a database that is hosted on a server or computing system that is not located on the same physical machine as the client accessing it. Instead, it is accessed over a network, such as a local area network (LAN), a wide area network (WAN), or the internet. In one or more embodiments, computing device 104 may be communicatively connected to remote database, wherein computing device 104 may receive and/or transmit any data as described in this disclosure. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device. In one or more embodiments, computing device 104 may transmit processes to server wherein computing device 104 may conserve power or energy.

With continued reference to FIG. 1, processor 108 is configured to receive input data 120 associated with an entity. "Input data" as described in this disclosure refers to machine-readable information that describes the entity. In one or more embodiments, input data 120 may include both structured and unstructured inputs. Structured inputs can be provided, by way of non-limiting example, in JSON, Avro, Protobuf, XML, CSV, fixed-width records, database 116 tuples, or keyed form submissions in which each field is addressable by a stable identifier and governed by explicit datatype and range constraints. Unstructured inputs may include interview transcripts, discovery-call recordings and their automated speech-to-text outputs, prospect-response text, client testimonials, matter or case summaries, website and landing-page copy, advertisement variants, review excerpts, intake notes, and operational metrics exported from internal systems. An "entity" as described in this disclosure refers to any person or organization for which differentiation is to be computed. For example, and without limitation, entity may include a professional-services business such as a law firm.

With continued reference to FIG. 1, in one or more embodiments, processor 108 may receive input data 120 through secure application programming interfaces, message queues, batch file ingress, or interactive user interfaces. Upon receipt, system 100 may apply schema-aware validation that performs datatype enforcement, required-field checks, enumeration and regular-expression validation, unit normalization and conversion, cross-field constraint evaluation, and referential-integrity resolution for linked resources. In one or more embodiments, system 100 may attached provenance and control metadata to each record, including timestamps, source and tenant identifiers, locale and unit declarations, schema version tags, content hashes for integrity verification, access-control labels, encryption indicators, digital signatures, and idempotency tokens to support safe retries and deduplication. Transport may be authenticated and encrypted in transit and at rest. Access may be restricted through role-based controls and audit logging.

With continued reference to FIG. 1, in one or more embodiments, input data 120 may include information describing identity and scope of the entity (for example, entity name, brand aliases, organizational unit, jurisdiction, geography, service regions), operational context of the entity (including practice areas, matter types, fee arrangements, client mix, case volumes, typical cycle-time targets, service-level objectives, applicable regulatory regimes, and confidentiality classes), proof-of-performance artifacts of the entity (such as representative results, awards, certifications, accreditations, case studies, ratings, testimonials, and press mentions). Additional inputs can capture staffing and credential descriptors (attorney and staff counts, bar admissions, specialty certifications, languages served), tooling and systems (document and matter-management platforms, analytics and call-tracking tools, calendaring and communications systems), and performance targets (key performance indicators, objectives and key results, thresholds, ranges, and measurement windows). Where applicable, the input data 120 can further include policy and constraint indicators (conflicts rules, security and data-handling requirements), brand and style preferences (tone, claims that must or must not be used), and scheduling and availability parameters (office hours, intake coverage windows, on-call rotations, blackout periods, and holiday calendars). Optional weighting hints may be provided as ordinal rankings, pairwise comparisons, or numeric weights.

With continued reference to FIG. 1, in one or more embodiments, system 100 may receive input data 120 through questionnaires delivered through secure web forms or authenticated APIs. Questionnaire fields can include practice focus, geographic coverage, client outcomes, differentiating processes, proof points, and style/brand constraints. Responses may be validated at submission and mapped to stable schema identifiers, with inline checks to ensure conformance to type and range constraints. In one or more embodiments, processor 108 may accept outputs of scripted discovery calls wherein calls can be recorded and transcribed, and the transcript processed by natural-language components to extract entities, normalize synonymous terms, identify dates, numbers, and jurisdictions, and bind extracted information to canonical attributes within the schema. In one or more embodiments, An AI-enabled intake agent may conduct or triage interviews, filter responses, segment dialogue into attribute-linked fields, assign confidence scores, and emit message-queue events or JSON payloads containing attribute values and metadata tags.

With continued reference to FIG. 1, in one or more embodiments, processor 108 may normalize data to a canonical schema during ingestion. Natural-language processing may perform sentence and section segmentation; named-entity recognition for parties, venues, awards, and metrics; resolution of synonyms and abbreviations to controlled vocabularies; redaction or hashing of personally identifiable information, unit harmonization of the entity (for example, normalizing currencies, dates, and measurement systems) and/or the like. The normalized result may be written as validated, machine-addressable records suitable for downstream computation.

With continued reference to FIG. 1, in one or more embodiments, processor 108 may further integrate with enterprise systems over authenticated APIs to retrieve entity-linked records and unify them with questionnaire or transcript data. Example systems include, but are not limited to, customer-relationship-management platforms, matter or case-management systems, document repositories, analytics dashboards, call-center and telephony systems, scheduling and calendaring tools, and content-management systems. Calendar entries and CRM records can provide durable identifiers, timestamps, and links to the associated questionnaires or transcripts. A unification layer may bind records to a persistent entity key, resolve duplicates using content hashes and soft-matching heuristics, and reconcile conflicting values according to source-of-truth policies.

With continued reference to FIG. 1, in one or more embodiments, an ingestion pipeline may maintain an event-sourced audit log capturing receipt events, validation outcomes, transformations applied, and operator interventions, enabling traceability and rollback. Quality-control routines can compute completeness and consistency scores, flag anomalies (for example, out-of-range metrics or contradictory fields), and queue items for human review when confidence thresholds are not met. Storage may employ append-only object stores for raw payloads and normalized relational or document stores for curated records, with indexing to support low-latency retrieval by downstream components. Upon successful ingestion and normalization, processor 108 may yield a validated, machine-readable representation of entity's input data 120, enriched with provenance and control metadata.

With continued reference to FIG. 1, in one or more embodiments, input data 120 may include a meeting transcript or multiple meeting transcripts. In one or more embodiments, meeting transcripts may be generated from an audio or audiovisual session associated with the entity (for example, a discovery interview, internal strategy meeting, client feedback session, or sales call). In one or more embodiments, system 100 may integrate with conferencing platforms using authenticated webhooks to receive recording artifacts and metadata (meeting identifier, organizer, participant list, start and end timestamps), or may ingest uploaded recordings through secure file ingress. Recordings can be normalized to a target sampling rate and codec, denoised, and voice-activity-detected prior to transcription. In one or more embodiments, Automatic speech recognition (ASR) may produce a time-aligned transcript with word-level timestamps and confidence scores. In one or more embodiments, Natural-language processing modules may convert the transcript into a schema-aligned representation suitable for downstream differentiation. Sentence and topic segmentation may derive sections such as agenda items, Q&A exchanges, objections, and resolution summaries. Named entity recognition and relation extraction may identify authenticity drivers (e.g., years of experience, certifications, trial outcomes), client-impact narratives (e.g., time-to-resolution reductions, compensation achieved), and market-distinction factors (e.g., unique intake process, 24/7 coverage, multilingual staff).

With continued reference to FIG. 1, in one or more embodiments, input data 120 may describe the entity itself. This can include the law firm's legal name, trade names, and corporate form. In one or more embodiments, input data 120 may include office locations and service regions. In one or more embodiments, input data 120 may include total headcount and headcount by role (partners, associates, paralegals, intake, operations). In one or more embodiments, input data 120 may include individual attorney and staff profiles. In one or more embodiments, input data 120 include bar admissions, licenses, certifications, languages, and years of experience. In one or more embodiments, input data 120 may include practice areas and subspecialties. In one or more embodiments, input data 120 may also describe work and results associated with the entity. This may include, for example, representative cases, outcomes, settlements, verdicts, and quantified impact. In one or more embodiments, input data 120 may further include content authored or controlled by the firm. This can include articles, blog posts, white papers, newsletters, and client alerts. Input data 120 may include website pages, landing pages, FAQs, and downloadable guides. Input data 120 may include advertisement copy, social posts, bios, and media kits. In one or more embodiments, input data 120 may include video scripts, webinar decks, podcast transcripts, and event presentations. In one or more embodiments, Operational and preference information may also be present. This can include brand voice and style guidelines. In one or more embodiments, input data 120 may include conflicts policies, compliance constraints, and security or privacy requirements. In one or more embodiments, input data 120 may include tooling and platforms used (document management, case management, analytics, telephony, calendaring, CRM). In one or more embodiments, input data 120 may include survey responses, reviews, testimonials, and Net Promoter or satisfaction scores. In one or more embodiments, input data 120 may include hiring and job postings that indicate capabilities and growth focus.

With continued reference to FIG. 1, processor 108 is configured to classify input data 120 to a descriptive class 124. A "descriptive class" as described in this disclosure refers to a label used to group an entity into a category that is representative of entity. For example and without limitation, descriptive class 124 may include categories such as industries associated with the entity, such as legal, medical, business, accounting and/or the like. In one or more embodiments, A descriptive class 124 can include groupings such as, but not limited to: industry and sub-industry; service line or practice area; jurisdiction and geography; client segment; business model (e.g., contingency, subscription, hourly); firm size or capacity band; channel strategy (e.g., referral-led, direct-response, enterprise); language coverage; regulatory regime; a maturity or growth stage and/or the like. In one or more embodiments, descriptive class 124 may include labels such as "personal injury-plaintiff," "mass torts," "catastrophic injury," "bilingual Spanish/English," "24/7 intake," "trial-oriented," and "Southeastern United States," expressed as categorical tags. In one or more embodiments, a descriptive class 124 may include temporal and/or geographic labels to reflect shifting markets. For example, temporal labels may allow recency weighting and seasonality considerations (e.g., emergent mass-tort categories). Geographic labels may constrain entities to relevant service areas and can be expressed in terms of cities, states, postal code sets, or court circuits.

With continued reference to FIG. 1, processor 108 may use a classifier, such as any classifier as described in this disclosure to classify entity to a descriptive class 124. In one or more embodiments, processor 108 may classify entity to descriptive class 124 by classifying input data 120 describing entity to a descriptive class 124. In one or more embodiments, descriptive class 124 may identify a field in which an entity operates, a state in which entity operates, and/or the like. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data 120 to one or more clusters and/or categories of features as represented in training data; this may be performed by representing both training data and input data 120 in vector forms, and using one or more measures of vector similarity to identify classifications within training data, and to determine a classification of input data 120. K-nearest neighbors algorithm may include specifying a K-value, or a number directing the classifier to select the k most similar entries training data to a given sample, determining the most common classifier of the entries in the database 116 116, and classifying the known sample; this may be performed recursively and/or iteratively to generate a classifier that may be used to classify input data 120 as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data 120, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, the classifier may be trained with training data containing a plurality of input data 120 correlated to a plurality of descriptive classes. In one or more embodiments, training data may include a particular input data 120 and/or data elements correlated to a descriptive class 124. In one or more embodiments, each training instance may include an input payload derived from the same ingestion pipeline used in production (e.g., normalized questionnaire fields, discovery-call transcripts, bios, website copy, operational metrics) and one or more ground-truth class labels drawn from the descriptive class 124 (e.g., industry/sub-industry, practice area, geography, client segment, business model, size band, language coverage, maturity stage). In one or more embodiments, labels may be provided as multi-label assignments with confidence values, enabling partial membership across overlapping niches (e.g., "personal injury-plaintiff," "catastrophic injury," "Southeastern U.S."). In one or more embodiments, classifier may include a supervised learning model trained on features extracted from input data 120. In one or more embodiments, supervised machine learning model, may include but is not limited to regularized logistic regression, linear SVMs, gradient-boosted decision trees, and neural architectures such as CNN/RNN text classifiers and transformer encoders fine-tuned for sequence or document classification. In one or more embodiments, classifier may operate in an embedding space, computing vector embeddings of input text and assigning classes by nearest-centroid or nearest-neighbor search against pre-computed class prototypes. A shallow discriminative head may be trained atop the embeddings to output calibrated posteriors. In one or more embodiments, training data may include both positive and hard-negative examples for each class. Positive examples may consist of entity materials that clearly express the class (e.g., practice-area pages, case summaries, explicit service statements). Hard negatives may be semantically similar but out-of-class examples (e.g., general civil litigation content used as negatives for "catastrophic injury"), which improve decision boundaries. Training data can further include metadata features such as geography, language, staffing counts, office hours, fee models, awards, and tool stacks; numeric features may be standardized and bucketed. For text, features can include token and character n-grams, key phrase extractions, and pretrained transformer embeddings (e.g., sentence-level vectors). In one or more embodiments, training data may include inputs received from previous iterations of the processing and previously classified descriptive classes. In one or more embodiments, classifier may be iteratively trained wherein following each set of input data 120 received and each descriptive class 124 that is classified, classifier may receive feedback indicating if the classification was correct. In one or more embodiments, classifier may be iteratively trained wherein input data 120 from previous iterations and correlated descriptive classes are used as training data and/or used to train classifier.

With continued reference to FIG. 1, processor 108 may be configured to apply a multi-label classifier configured to output a confidence vector for each descriptive class 124 of a plurality of descriptive classes. A "multi-label classifier" as described in this disclosure is a classifier configured to output multiple labels simultaneously from a predefined set of descriptive classes. Unlike multiclass (single label) classifiers that select exactly one label and whose output probabilities sum to one, a multi-label classifier produces an independent confidence score per class allowing overlapping assignments. In one or more embodiments, multi-label classifier May be realized as a shared encoder (e.g., transformer or other neural network) with sigmoid activations on output units trained with binary cross-entropy per class. A "confidence vector" as described in this disclosure is a data structure that encodes likelihood scores across a predefined set of descriptive classes. For example, and without limitation confidence vector may indicate that the likelihood of input data 120 and/or entity belonging to a particular class is high, while the likelihood for another descriptive class 124 is low. In one or more embodiments, each confidence vector may include one score for each descriptive class 124 in a predefined class schema. In one or more embodiments, each score may indicate the classifier's confidence that the input should be assigned that class. In one or more embodiments, confidence vector is generated by a classifier that applies a shared encoder to the input (e.g., text and structured attributes) and then evaluates the encoded representation against a set of class-specific decision heads. Each decision head outputs a confidence score for its corresponding class. The resulting scores are assembled, in a fixed class order, into the confidence vector. In one or more embodiments, classifier may also produce auxiliary data alongside the vector, such as per-class reasoning artifacts (e.g., salient spans or features), model identifiers, and timestamps for auditability. In one or more embodiments, system 100 may perform calibration on the raw scores so that each value better reflects the empirical likelihood of correctness for its class. Calibration may be performed per class using established techniques (for example, Platt scaling or isotonic regression) fitted on held-out data. The calibrated confidence vector can be consumed directly by downstream logic that applies per-class thresholds, selects the top-k classes, enforces hierarchical consistency between parent and child classes, or records abstentions where confidence falls below a tolerance. In one or more embodiments, confidence vector may further include or reference metadata that supports safe and reproducible use, such as decision thresholds, uncertainty estimates obtained from model assembling or repeated stochastic inference, and links to the evidence that most influenced each class score. In one or more embodiments, multi-class classifier may be used to indicate the confidence that each entity belongs to a particular class. In one or more embodiments, this may allow for instances in which an entity belongs to multiple classes, such as for example, an attorney that practices family law and personal injury. In one or more embodiments, confidence vectors may be used to indicate the relative weighting of each descriptive class 124, such as for example, 60% family law and 40% personal injury.

With continued reference to FIG. 1, processor 108 is configured to command an adaptive web crawler 128 to retrieve descriptive content 132 associated with the descriptive class 124. A "web crawler" as described in this disclosure (or "crawler") is a computer-implemented agent that programmatically discovers, fetches, and records content from network-accessible resources such as websites and APIs. A crawler may perform URL scheduling, HTTP fetching, robots.txt evaluation, rate limiting, content parsing, canonicalization, duplicate detection, and metadata capture (e.g., timestamps, source URLs, checksums). In one or more embodiments, crawler may extract page text, structured data (such as JSON-LD and schema.org markup), media transcripts, and link graphs, and may persist both raw and normalized representations for downstream processing. In one or more embodiments, crawler may perform entity resolution to associate retrieved pages with specific organizations based on name, address, phone number, schema identifiers, and consistent branding signals. A "adaptive web crawler" as described in this disclosure is a crawler that operates under class-specific constraints and objectives derived from the descriptive class 124 assigned to the input data 120. Rather than crawling broadly, the adaptive crawler may use curated seed lists, class-aware query templates, source whitelists/blacklists, and extraction templates to focus on content that is most likely to be relevant to the class. For example, for a descriptive class 124 related to personal injury (plaintiff), targeted sources can include plaintiff-focused law firm sites, practice-area landing pages, verdict and settlement summaries, "about" and values pages, intake hours disclosures, reviews and testimonials, attorney bios, job postings that reveal practice emphasis, advertisements and campaign landing pages, local bar association listings, court or docket summaries, and structured metadata embedded in those pages. Geographic and jurisdictional filters may be applied so that results reflect the service regions indicated by the class. The adaptive crawler may implement freshness windows and change-detection logic to prioritize recently updated pages and ad variants and can apply template de-duplication to avoid overweighting boilerplate content shared across a site. In one or more embodiments, the adaptive crawler may include a targeted web crawler which is configured to identify a specific set of information. In one or more embodiments, adaptive crawler may be adapted to crawl for differing classes based on each entity.

With continued reference to FIG. 1, web crawler 128 is configured to retrieve descriptive content 132 associated with descriptive class 124. "Descriptive content" as described in this disclosure refers to network-available information that characterizes the same field or competitive cohort as the classified entity. For example, and without limitation, an entity may be classified to a personal injury class wherein descriptive content 132 may include information associated with the personal injury class. Descriptive content 132 mat class-scoped, wherein for example, for a personal injury class, this includes personal-injury practice descriptions, case results, intake promises (e.g., 24/7 availability), trial orientation statements, fee arrangements (e.g., contingency), multilingual service claims, and market-facing differentiators published by entities competing in that practice and geography. Descriptive content 132 may appear as free text, structured snippets (e.g., schema.org LegalService, Organization, or Review nodes), downloadable brochures, video transcripts, or ad copy variants. Each item of descriptive content 132 can be stored with provenance (URL, retrieval time, crawl policy identifier), legal/compliance flags (robots.txt status, terms-of-use acknowledgment), and integrity markers (content hash) to support auditability and safe reuse. In one or more embodiments, descriptive content 132 may include category of information within input data 120 that may be associated with a differing entity. For example, and without limitation, input data 120 may include litigation success rates of other firms. In one or more embodiments, descriptive content 132 may include any information that may be compared against input data 120 in order to distinguish between entity and other organizations.

With continued reference to FIG. 1, processor 108 may command adaptive web crawler to retrieve descriptive content 132. In one or more embodiments, processor 108 may issue a crawl job specification over an authenticated API to a crawl service. The specification may include the descriptive class 124 identifier(s), seed URLs and directories, query templates and search operators, allowed and disallowed domains, etch budgets, depth limits, and rate limits, geographic or language constraints, extraction templates indicating which page elements and structured fields to capture and/or the like. In one or more embodiments, processor 108 may publish a crawl task to a message queue (e.g., a work item) that is consumed by a fleet of crawler workers. The task may encodes the same parameters and include a recrawl policy (e.g., hourly for ads, weekly for bios, monthly for static pages) and a freshness threshold beyond which content is deprioritized. In one or more embodiments, processor 108 may invoke crawler through an event-driven policy engine wherein when the classifier emits a confidence vector that crosses a threshold for a particular class, the policy engine automatically triggers class-bound crawl profiles with pre-configured seeds, filters, and extraction rules. In one or more embodiments, processor 108 may also schedule periodic maintenance crawls (e.g., cron-like schedules) to refresh cohorts, perform incremental crawls that fetch only changed pages based on ETags or content hashes, and initiate on-demand crawls when new evidence needs validation.

With continued reference to FIG. 1, processor 108 may command adaptive web crawler based on the descriptive class 124 by retrieving a crawl policy associated with that class from a policy registry. A "crawl policy" as described in this disclosure is a machine-readable specification that encodes, for a given class, how information should be retrieved. In one or more embodiments, crawl policy may include seed sources (directories, known competitor domains, bar association listings), query templates (class-specific search strings and operators), source allow/deny lists, fetch budgets, depth limits, rate limits, geographic and language constraints, page-type filters (e.g., practice pages, case results, reviews, job postings), and extraction templates (selectors for text blocks, schematogram nodes, and down-loadable artifacts). Upon receiving the descriptive class 124 assignment, processor 108 may load the corresponding policy, bind any variable fields (e.g., city, state, county, language), and issue a crawl job to the crawler with the concretized parameters. In one or more embodiments, when no matching policy exists or when the confidence vector indicates a novel class combination (e.g., multi-label assignment spanning overlapping niches), processor 108 may generate a new class-bound crawl policy on demand. Policy generation can proceed by composing reusable policy fragments—for example, a "personal injury-plaintiff" fragment, a "bilingual Spanish/English" fragment, and a "Southeastern U.S." fragment-merging their seeds, whitelists, and extraction templates while resolving conflicts via precedence rules. In one or more embodiments, processor 108 may synthesize query templates by interpolating class descriptors into parameterized search strings (e.g., "site: *.law 'verdicts' AND '[practice]' AND ('[city]' OR '[county]')") and may instantiate geographic filters as polygon or postal-code sets derived from class facets. The resulting policy is versioned, signed, and stored back into the registry for reuse. For multi-label class assignments, processor 108 may construct a composite crawl policy that balances signals across labels. The composite policy may include a weighting plan that allocates fetch budgets proportionally to class confidences (e.g., more budget to "trial-oriented PI" than to a low-confidence "mass tort" facet), enforces hierarchical consistency (promotion of parent sources when a child class is active), and resolves conflicting directives (e.g., deny-lists from one facet vs. allow-lists from another) using deterministic conflict-resolution rules. Where classes share redundant seeds, processor 108 may collapses them to a single canonical source with per-class extraction templates applied at parse time.

With continued reference to FIG. 1, during execution, adaptive crawler may apply robots.txt and rate-limit compliance, uses canonical URL detection to collapse duplicates, and performs segment-level extraction to isolate the portions of a page that correspond to descriptive content 132 (for example, the practice-area section versus navigation menus). Retrieved content may be normalized (character encoding, language detection, optional translation), text may be segmented into analysis-ready chunks, and metadata may be attached (class identifier, source type, geotags, crawl policy version). In one or more embodiments, crawler may invoke site-specific APIs (e.g., headless CMS endpoints, search endpoints, or public JSON feeds) to obtain higher-fidelity structured data within the same class constraints. In one or more embodiments, processor 108 may monitor crawl telemetry (e.g., success rates, coverage, recency) and may adapt parameters in real time (e.g., throttle rates, expand seeds, tighten filters) to maintain compliance and maximize relevant yield for the descriptive class 124.

With continued reference to FIG. 1, processor 108 may be configured to apply multi-label classifier configured to output a confidence vector for each descriptive class 124 of a plurality of descriptive classes and command adaptive web crawler to retrieve descriptive content 132 by triggering one or more class-specific crawl policies for the adaptive web crawler based on the descriptive content 132. For each selected class, processor 108 may retrieves or synthesizes a crawl policy that specifies seeds (directories, known competitor domains), query templates, source allow/deny lists, fetch budgets, depth and rate limits, page-type filters (e.g., practice pages, case results, reviews, job postings), extraction templates for structured fields, and freshness windows. The processor 108 binds class parameters (e.g., jurisdiction, locale, service region) into the policy and issue a crawl job to the crawler through an authenticated interface. When multiple classes are active, processor 108 may construct or composes a composite policy that merges class policies, resolves conflicts deterministically (e.g., precedence rules for allow/deny lists), and allocates fetch budgets proportionally to class confidences. In one or more embodiments, processor 108 may schedule recrawl intervals and change-detection thresholds per class, enforce compliance directives (robots.txt handling, PII redaction), and monitor crawler telemetry to adapt policy elements at runtime (e.g., expanding seeds or tightening filters) until sufficient descriptive content 132 for the selected classes has been retrieved and logged with provenance for downstream processing. In one or more embodiments, processor 108 may retrieve multiple crawl policies based on confidence vectors. In one or more embodiments, confidence vectors above a particular threshold may be used to identify descriptive content 132. In one or more embodiments, processor 108 may apply weightings to descriptive classes based on their confidence vector, wherein confidence vectors with higher scores or higher levels of confidence may be given a larger weighting. In one or more embodiments, processor 108 may translate confidence vector into crawl-control directives by mapping per-class confidences to concrete policy selections and resource allocations. For each class, whose confidence exceeds a configurable threshold, processor 108 may activates the corresponding class policy and allocates fetch budgets proportionally to the confidence values, optionally enforcing a minimum floor to guarantee baseline coverage of lower-confidence classes. Geographic, language, and jurisdictional facets extracted from the input data 120 may be bound into the policy parameters so that queries and seed lists are localized to the entity's service regions. Where multiple active classes specify conflicting allow/deny lists or duplicate seeds, processor 108 may apply deterministic conflict-resolution rules (e.g., parent-class precedence, domain reputation scoring) and de-duplicates seeds before dispatch. In one or more embodiments, processor 108 may further stage the crawl in phases keyed to the confidence vector by for example, prioritizing high-signal sources (practice pages, case results, ad variants) for top-confidence classes in phase one, followed by secondary sources (reviews, job postings, press) in phase two, while monitoring telemetry (coverage, recency, duplication rate, high-signal yield) to dynamically increase or decrease budgets, expand query templates, or pause low-yield classes. If all class confidences fall below an abstention threshold, processor 108 may defer crawling or issue a narrow exploratory crawl to gather clarifying signals, then recompute the confidence vector and repeat the policy selection cycle.

With continued reference to FIG. 1, processor 108 may be configured to transform descriptive into a descriptive embedding within a shared feature space. A "descriptive embedding" as described in this disclosure is a fixed-length numeric representation of data. In one or more embodiments, descriptive embedding may include a numerical representation of descriptive content 132 and/or a portion of descriptive content 132. In one or more embodiments, descriptive embedding may include an array of real-valued components, which encodes salient information drawn from diverse inputs in a form suitable for mathematical comparison. In one or more embodiments, descriptive embedding may include a vector. A "vector" as defined in this disclosure is a data structure that represents one or more a quantitative values of data. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted $\|a\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

With continued reference to FIG. 1, a "shared feature space" as described in this disclosure refers to a common coordinate system. In one or more embodiments, shared feature space may include a common coordinate system in which descriptive content 132 associated with the descriptive class 124 is represented by embeddings (e.g. descriptive embeddings) of the same dimensionality and semantics so that distance or similarity operations, including cosine similarity and related metrics, are well defined and comparable across publishers, sources, and data types. In one or more embodiments, processor 108 may transform descriptive content 132 into vectorized embeddings and/or descriptive embeddings with scale-aware normalization of source values so that data can be fused without losing their meaning. Numeric fields (for example, hours of availability, years of experience, count of trial wins) may be standardized by z-scoring, min-max normalization, or percentile mapping. Ordinal fields (for example, ranking bands or seniority levels) may be converted using monotonic rank mappings that preserve order. Categorical fields (for example, practice areas, jurisdictions, languages served, fee models) may be encoded with learned or one-hot vectors, and fixed-sum profiles (for example, channel mix percentages) may be projected using constraint-preserving mappings that maintain sum relationships. In one or more embodiments, unstructured data within the descriptive content 132 may be embedded with modality-appropriate encoders prior to fusion. Text (for example, page copy, headlines, FAQs, transcript snippets) may be converted to text embeddings using transformer encoders; audio/video materials may be transcribed and then embedded as text, and structured markup may be flattened to canonical key-value text prior to embedding. These modality-specific vectors, together with normalized structured features, may be aligned in size and concatenated or otherwise combined. In one or more embodiments, processor 108 may project the combined features into the shared feature space using a learned or configured mapping. The projection can be implemented as a linear transformation, multi-layer perceptron, autoencoder bottleneck, or attention-based fusion block that outputs a fixed-dimension vector. In one or more embodiments, processor 108 may apply normalization (for example, L2 normalization) so that embeddings support stable orientation-based similarity. Where features are missing or downweighted due to low confidence, stale timestamps, or policy flags (for example, redaction of personally identifiable information), processor 108 may apply masking or confidence weights during fusion so the embedding reflects data quality as well as content. In one or more embodiments, processor 108 may record embedding provenance alongside each numeric vector, including contributing sources, section types, normalization choices, projection version, dimensionality, crawl-policy identifiers, and any confidence or freshness weights. As a result, processor 108 may generate embeddings that encode heterogeneous, class-scoped inputs into fixed-length representations located in a shared feature space, thereby enabling reliable, scale-aware comparison across competitors and subsequent operation of contrast and distinctiveness computations used to condition the large language model.

With continued reference to FIG. 1, transforming the descriptive content 132 into a plurality of descriptive embeddings within a shared feature space may include a preprocessing stage in which processor 108 normalizes class-scoped materials gathered by adaptive web crawler. Normalization may include decoding character sets, removing navigation and boilerplate, segmenting pages into semantically coherent sections (for example, "results," "process," "values," "availability," "fees," "bios," "reviews," "ads", detecting language and applying translation where required; attaching jurisdiction and geography tags, enforcing privacy controls, including redaction or hashing of personally identifiable information and/or the like. Each segment may be persisted with provenance metadata (source URL, crawl timestamp, crawl-policy identifier, content hash, and robots.txt status) to support auditability. In one or more embodiments, processor 108 may convers each segment into a descriptive embedding using modality-appropriate encoders. Textual sections (headlines, body copy, FAQs, captions, transcripts, structured markup flattened to canonical key-value text) may be tokenized and encoded by transformer-based text encoders tuned for professional-services semantics. Structured fields extracted from markup (practice area, jurisdiction, hours, fee model, languages, awards) are mapped to canonical labels and encoded as categorical, ordinal, or numeric feature vectors. Where media assets are present, audio/video may be transcribed and summarized to text prior to embedding so that all modalities ultimately feed a text-compatible representation. Template detection and duplicate suppression can collapse repeated boilerplate to canonical segments, preventing site-wide templates from skewing representation.

With continued reference to FIG. 1, processor 108 may fuse modality-specific vectors with normalized structured features through a learned or configured projection to produce fixed-dimension embeddings aligned to the shared feature space. Class awareness may be injected via side features or tokens representing the descriptive class 124, geography, and language, enabling cohort-normalized alignment that separates boilerplate statements from genuinely distinctive content. The projection can be implemented as a linear transform, multi-layer perceptron, autoencoder bottleneck, or attention-based fusion block. Quality attributes (such as recency, extraction confidence, and policy flags) may be applied as confidence weights or masks during fusion so that the resulting embedding reflects both content and data quality. Processor 108 may apply normalization to the output vectors to support stable orientation-based similarity metrics.

With continued reference to FIG. 1, processor 108 may generate a plurality of descriptive embeddings, wherein each descriptive embedding may encompass a particular class of information, and/or the like. Each embedding may be labeled with section type, class facets, freshness indicators, and evidence strength, and may be stored in a vector index that supports approximate nearest-neighbor search, filters for class and geography, recency windows, and de-duplication by content hash. Provenance accompanies every vector, including encoder and projection versions, parsing parameters, crawl-policy identifiers, and links back to the raw artifact and extracted fields. Separate namespaces may be maintained for competitor content and for the entity's own materials while retaining a common shared feature space so that vectors are directly comparable.

With continued reference to FIG. 1, in one or more embodiments, embeddings of input data 120 (for example, interview transcripts, website copy, results summaries, bios) may be produced using the same encoders, normalization, and projection pipeline, thereby ensuring that both descriptive content 132 and input data 120 occupy the same shared feature space. This alignment allows processor 108 for perform well-defined similarity and distance operations, such as orientation-based similarity, nearest-neighbor lookups, and distances to cohort centroids, between the entity's embeddings and the plurality of descriptive embeddings. Section-type-aware comparisons may be enforced so that like is compared with like (for example, "trial orientation" sections compared only against "trial orientation" sections), yielding reliable, scale-aware contrasts that are robust to formatting differences and document length.

With continued reference to FIG. 1, processor 108 is configured to extract a plurality of positioning signals 140 from the input data 120 associated with the entity. A "positioning signal" as described in this disclosure refers to a grouping of information that indicates a feature of the entity as described within input data 120. For example and without limitation, position signal may include information associated with cases won, cases lost, client managed and/or the like. In one or more embodiments, positioning signal 140 may include any quantifiable information. In one or more embodiments, positioning signals 140 may include a grouping of information. In one or more embodiments, each positioning signal 140 may include fixed-length representation situated in shared feature space allowing direct similarity and distance comparisons against other signals, both from input data 120 and from depictive embeddings, and from class-scoped descriptive content 132 gathered by the adaptive web crawler. Positioning signal 140 may carry associated metadata, including a canonical label, category tags, provenance links to source spans or fields, confidence and freshness weights, and evidence strength. In one or more embodiments, each positioning signal 140 may refer to a grouping of information from a particular category of one or more categories. Categories of information may summarize related facts or outcomes into consistent constructs. Non-limiting examples of grouping categories include: case outcomes (cases won, cases lost, dismissals, appeals), financial results (settlement amounts, verdict amounts, contingency percentages, fee recoveries), matter mix (motor vehicle, rideshare, premises liability, catastrophic injury), capability and experience (trial appearances, jury trials within a window, certifications, multilingual coverage), throughput and timeliness (average time to resolution, intake response-time bands), and client experience (review ratings, testimonial frequency, NPS). Each category may define expected attributes, normalization rules, and accepted evidence types so that inputs conform to a canonical schema prior to embedding. In one or more embodiments, processor 108 may be configured to classify input data 120 to one or more categories, such as any categories as described above. In one or more embodiments, each grouping of information (e.g., cases settled) may then be transformed into a separate positioning signal 140. In one or more embodiments, each positioning signal 140 may represent a particular category of information, such as, but not limited to, cases won, cases lost, maximum settlement amounts and/or the like. Extraction may include segmenting normalized inputs (questionnaires, discovery-call transcripts, website copy, reviews, operational metrics) into semantically coherent units (e.g., "results," "process," "values," "availability," "fees," "bios"), classifying each unit with a multi-label classifier into one or more grouping categories with calibrated confidence and parsing category-specific attributes using analyzers appropriate to the unit (e.g., lexicon/regex detectors for fee disclosures and hours; named-entity and relation extraction to link outcomes to practice areas and venues; key phrase extraction and topic models for themes; embedding-based clustering for recurring claims). High-confidence category assignments may invoke category-tailored extractors that capture the relevant fields, such as outcome type, amount, date, venue, opposing party, reviewer rating, language coverage, hours, or response-time thresholds. For each categorized unit, processor 108 may form a typed signal record, then construct positioning signal 140 embedding by fusing text-derived vectors with normalized structured attributes. For example, system 100 may encode the supporting text span (e.g., "secured a $2.1M verdict in Fulton County in 2024") with a transformer text encoder, normalize structured attributes (amount in canonical currency, venue/jurisdiction codes, date recency, matter type) and encode them as numeric/categorical vectors and project the concatenated features through a learned or configured mapping (e.g., linear layer, multi-layer perceptron, or attention-based fusion) into the shared feature space. Class-awareness may be injected through side tokens or features representing the descriptive class 124, geography, and language to ensure cohort-normalized alignment. In one or more embodiments, processor 108 may apply masking and confidence weights during fusion when evidence is stale, sparse, or low-quality so that the resulting embedding reflects both content and reliability.

With continued reference to FIG. 1, positioning signals 140 arising from multiple sources may be consolidated to reduce redundancy. Semantically equivalent claims (e.g., "24/7 intake," "round-the-clock phones," "we answer day or night") may be clustered via similarity in the shared feature space and canonicalized into a single positioning signal 140 with merged evidence and roll-up statistics; duplicates are collapsed using locality-sensitive hashing or template detection. Conflicts (e.g., inconsistent hours or fee statements) are resolved using precedence policies (most recent, highest-authority source), with low-confidence cases flagged for review. Where appropriate, category definitions supply aggregation rules so that signals encode counts, rates, or distributions (e.g., number of jury trials in the last 24 months; median settlement amount with interquartile range; response-time band coverage), and these aggregates may likewise be embedded by fusing textual summaries with structured summaries into a single vector.

With continued reference to FIG. 1, each positioning signal 140 may include a vector embedding within shared feature space, suitable for direct comparison to competitor embeddings, such as despite embeddings and metadata including the canonical label, category tags (e.g., authenticity, impact, distinction, geography), evidence links (document IDs, segment offsets, URLs), encoder/projection versions, confidence and freshness weights, and lineage records. In one or more embodiments, positioning signals 140 may be stored a signal store and indexed in a vector index that supports approximate nearest-neighbor search, class and geography filters, freshness windows, and audit retrieval. Because both the entity's positioning signals 140 and the class-scoped descriptive content 132 (e.g. descriptive embeddings) are embedded in the same shared feature space using the same normalization and projection pipeline, subsequent stages can compute like-for-like contrasts (e.g., entity settlement-amount signals vs. competitor settlement-amount sections), enabling precise distinctiveness and benefit determinations as described elsewhere in this disclosure.

With continued reference to FIG. 1, in one or more embodiments, input data 120 associated with an entity is converted into a plurality of positioning signals 140, wherein each positioning signal 140 corresponds to a category of information and is represented as a vector (embedding). Likewise, descriptive content 132 associated with descriptive class 124 is converted into a plurality of descriptive embeddings, wherein each descriptive embedding corresponds to a category of information and is represented as a vector. Categories may be broadly defined and may include, without limitation, case outcomes (e.g., wins, dismissals, verdicts), financial results (e.g., settlement amounts, fee models), capability and experience (e.g., trial appearances, certifications, languages), matter mix (e.g., motor vehicle, premises, catastrophic injury), timeliness and throughput (e.g., time-to-resolution, response bands), client experience (e.g., ratings, testimonials), and operational attributes (e.g., availability windows, intake coverage). By expressing both input data 120 and descriptive content 132 as vectors organized by like categories, system 100 may be enabled to direct, like-for-like comparison of vectors associated with related categories of information. In one or more embodiments, processor 108 may first classify input data 120 and/or descriptive content 132 prior to embedding. In one or more embodiments, processor 108 mat assign segments of input data 120 and segments of descriptive content 132 to one or more categories using rule-based detectors, supervised or semi-supervised classifiers, embedding-space nearest neighbor methods, and/or few-shot or zero-shot LLM prompts constrained by a class schema. Each segment may receive one or more category labels (optionally with confidence scores), ensuring for example, that "settlement amount" text is labeled as such, "trial orientation" statements are labeled accordingly, and so on. Category labeling may include hierarchical relations (e.g., parent "personal injury" with child "motor vehicle"), geographic and language facets, and freshness indicators. Following classification, processor 108 may then convert labeled segments to embeddings using modality-appropriate encoders (e.g., transformer-based text encoders for text; normalized categorical/numeric encodings for structured fields; transcript-to-text for media and fuses any structured attributes relevant to the category (e.g., amounts, dates, venues, jurisdictions)

into the vector using a learned or configured projection. Both positioning signals 140 (from the entity) and descriptive embeddings (from the crawler) are then mapped into the same shared feature space, with consistent dimensionality and semantics, optional normalization, and attached provenance and confidence metadata. Because vectors for matching categories occupy a common coordinate system, processor 108 can perform well-defined similarity and distance operations, rank neighbors, compute separations to cohort centroids, and otherwise assess contrast between the entity's positioning signals 140 and class-scoped descriptive embeddings thereby enabling accurate, category-aware differentiation and downstream conditioning of a large language model.

With continued reference to FIG. 1, each positioning signal 140 may include a signal embedding within shared feature space. A "signal embedding" as described in this disclosure is a fixed-length, machine-readable vector. In one or more embodiments, signal embedding may be produced by fusing the supporting text (e.g., sentence or section spans from questionnaires, discovery-call transcripts, website copy, reviews) with any normalized structured attributes relevant to the signal's category (e.g., amounts, dates, jurisdictions, hours, languages, outcome types). The fusion may be realized using a learned or configured projection so that all signal embeddings share the same dimensionality and semantics, enabling well-defined similarity and distance operations across signals and sources. The embedding may be normalized to promote orientation-based comparisons and is generated using the same encoders, normalization steps, and projection versions described in this disclosure to ensure consistency with descriptive embeddings created from class-scoped content. In one or more embodiments, signal embedding may be generated similar to that of descriptive embedding as described in this disclosure, With continued reference to FIG. 1, processor 108 is configured to generate a contrast score 136 for each positioning signal 140 of the plurality of positioning signals 140 by comparing the plurality of positioning signals 140 to the descriptive content 132. A "contrast score" as described in this disclosure is a computed measure that indicates how information expressed by a positioning signal 140 differs from information observed in class-scoped descriptive content 132. For example, and without limitation contrast score 136 may indicate how much more revenue an entity creates in comparison to other entity's in the same field. Contrast score 136 may summarize differences at the level of the relevant category of information (such as case outcomes, settlement amounts, response times, trial orientation, availability windows, language coverage, client ratings, or fee arrangements) and may reflect whether the entity appears more, less, or similarly situated relative to the cohort described by the descriptive content 132. In one or more embodiments, contrast score 136 may include numeric components and descriptive components. Numeric components may quantify differences between the entity and the cohort using values derived from the descriptive content 132, which can include quantifiable information such as totals, counts, percentages, medians, means, ranges, or other aggregated statistics (for example, average settlement amount across peers, typical response-time bands, distribution of review ratings, proportion of jury trials in the cohort). Descriptive components may capture qualitative differences, such as presence or absence of a claim (e.g., 24/7 intake stated or not), dominance of certain themes (e.g., trial-first messaging versus negotiation-first messaging), or unique attributes (e.g., bilingual intake in a geography where peers rarely advertise multilingual support). The contrast score 136 may be produced per category of information to enable like-for-like comparison. For example, and without limitation, a positioning signal 140 in the financial results category may be contrasted against cohort statistics for settlement amounts and verdicts. Similarly, a signal in the throughput and timeliness category may be contrasted against cohort response-time and time-to-resolution norms; a signal in the capability and experience category may be contrasted against peers' reported trial counts or certifications. For each category, processor 108 may compute a difference value (e.g., delta from a cohort average or distance from an expected band) as a contrast score 136 and may attach a succinct explanation indicating what aspect of the entity's information drives the observed difference.

With continued reference to FIG. 1, the processor 108 may generate a contrast score 136 for each positioning signal 140 by comparing the information represented by that signal to descriptive content 132 collected for the same descriptive class 124. The score may include one or more components, including a distinctiveness component that reflects rarity or separation from peers and, in one or more embodiments, a favorability component that reflects whether the observed difference is advantageous, neutral, or disadvantageous. In one or more embodiments, processor 108 may constrains comparisons to like-for-like categories of information (e.g., "settlement amounts" vs. "settlement amounts," "trial orientation" vs. "trial orientation," "availability windows" vs. "availability windows") using the category labels previously assigned to positioning signals 140 and to descriptive content 132 segments. Category alignment may enforce section-type filters, jurisdiction filters, and time windows so that the cohort baseline reflects the same semantic role, location, and recency as the entity's signal. In one or more embodiments, processor 108 may performs cohort aggregation to derive reference statistics for each category. For categories with quantifiable values (e.g., dollar amounts, counts, response times, ratings), processor 108 may computes cohort summaries such as totals, proportions, medians, means, ranges, percentiles, and recent-trend indicators. For categories with qualitative claims (e.g., "24/7 intake," "bilingual staff," "trial-first strategy"), processor 108 may computes cohort prevalence (presence/absence counts and rates), common phrasings, and saturation indicators. Processor 108 may then compute difference measures between the entity's positioning signal 140 and the cohort baselines. For numeric categories, difference measures may include absolute and relative deltas from cohort averages or medians, rank positions within cohort distributions, percentile placement, and standardized deviations that account for cohort spread. For qualitative categories, difference measures may include prevalence contrast (e.g., rare vs. common), presence/absence differentials within the cohort, and phrase uniqueness relative to common templates. These measures can be accompanied by explanations (e.g., "entity reports median response under one hour; cohort median between two and four hours").

With continued reference to FIG. 1, processor 108 may compute distinctiveness indicators that capture how unusual the entity's information is within the class. For numeric data, distinctiveness may reflect how far the entity's value sits from typical bands or from a representative cohort center. For qualitative claims, distinctiveness may reflect the rarity of the claim across peers, adjusted for duplicated templates and boilerplate. Processor 108 may discount signals derived from templated or syndicated content identified during crawling to avoid over-crediting claims that many sites share verbatim. Additionally or alternatively processor 108 may optionally compute a favorability indicator that reflects whether the difference is likely to be beneficial, neutral, or detrimental. For numeric categories, favorability may be derived from business-appropriate directionality (e.g., faster response times are better; higher verified outcomes may be better; higher fees may be worse) and from observed market preferences. For qualitative categories, favorability may reflect the presence of credible evidence (e.g., awards, case citations) and the clarity and specificity of the claim relative to cohort norms. The favorability indicator may be encoded as a signed or labeled attribute (e.g., positive/neutral/negative) and accompanied by a short rationale.

With continued reference to FIG. 1, processor 108 may generate multi-granular contrast scores 136. A per-signal score may be computed for each positioning signal 140 against matched cohort segments. A rolled-up category score summarizes all signals within a category (e.g., all settlement-amount statements) using aggregation rules (e.g., medians, weighted averages, or worst-case/best-case bounds) and an overall score for a descriptive class 124 can be derived for reporting or gating. Each score may include provenance (which cohort segments and baselines were used), time stamps, and any applied filters. In one or more embodiments, contrast score 136 may further include a direction indicator (e.g., better, worse, or neutral relative to the cohort benchmark) and an intensity level (e.g., low, medium, high difference). In one or more embodiments, processor 108 may compute contrast scores 136 against one or more appropriate sub-cohort aggregates so that comparisons remain contextually fair.

With continued reference to FIG. 1, processor 108 may be configured to generate contrast score 136 for each positioning signal 140 by identifying a distance between each signal embedding and each descriptive embedding and generating the contrast score 136 based on the distance. Distance may refer to a measure of separation or closeness between two vectors in the shared feature space. Because both positioning signals 140 and descriptive content 132 are mapped to the same dimensionality and semantics, distances may be well defined and comparable across sources. In one or more embodiments, processor 108 may perform category-aligned retrieval prior to distance computation. For a given positioning signal 140, processor 108 may restrict comparisons to descriptive embeddings that share the same category (e.g., settlement amounts, trial orientation, availability windows) and, where applicable, the same jurisdiction, language, and recency band. In one or more embodiments, processor 108 may compute distance using one or more vector similarity metrics. Examples include orientation-based measures (e.g., cosine-type similarity converted to a separation score), inner-product-based measures, and geometric measures (e.g., Euclidean- or Manhattan-type separations) applied to normalized vectors. In one or more embodiments, system may apply metric learning or whitening during projection so that distances emphasize dimensions known to be discriminative for the class. The selected metric can be configured per category; for example, orientation-based measures may be preferred for long-form text sections, while geometric measures may be applied to fused vectors that include structured attributes. In one or more embodiments, system may use a vector index that supports approximate nearest-neighbor search. Given a signal embedding, processor 108 may query the index to retrieve the top matches from the relevant cohort slice and records both the nearest-neighbor distances and the identities of the matched descriptive embeddings. Processor 108 may compute additional statistics such as the distance to the cohort centroid, the average distance to the top-k neighbors, the gap between the closest and next-closest neighbors, and the coverage of neighbors across distinct publishers. These statistics are retained for later aggregation. In one or more embodiments, processor 108 may compute the final contrast score 136 from one or more distance-based summaries. Non-limiting examples include: a score based on the distance to the cohort centroid for the matched category, indicating separation from typical cohort content, a score based on the average or median distance to the top-k nearest competitors, indicating local distinctiveness, a score based on the proportion of neighbors within a small radius, indicating cohort saturation; and a score based on the margin to the nearest competitor, indicating the degree of immediate differentiation. Each summary may be normalized to a consistent reporting scale and accompanied by a short rationale ("farther than typical from cohort center," "few close neighbors," "tight cluster near competitors," etc.). In one or more embodiments, vectors (e.g., signal embedding and/or descriptive embedding) residing in the shared feature space may be compared to compute contrast scores 136 by performing category-aligned retrieval of relevant cohort vectors and then evaluating separation between a given signal vector and those cohort vectors using configured similarity or distance measures. In one or more embodiments, processor 108 may calculate contrast score 136 using one or more processes such as proximity to a cohort-representative vector, average separation to the top-k nearest cohort vectors, density of close neighbors within a small radius, and the gap to the nearest competitor vector. In one or more embodiments, processor 108 can weight contributions by source quality, recency, jurisdiction, and de-duplication status to reduce bias from stale or templated content.

With continued reference to FIG. 1, distances between embeddings may be operationalized into a contrast score 136 by translating raw separation signals into interpretable, category-aware indicators. After filtering cohort embeddings to those that match the positioning signal's category and facets (e.g., jurisdiction, language, recency), processor 108 may measure how far the signal embedding lies from a cohort-representative vector, its nearest competing vectors, and/or dense regions of the cohort distribution. These distance measurements may then be aggregated and normalized to a common reporting scale, with optional adjustments for source quality, sample size, and template duplication. Larger separations may indicate greater distinctiveness, tight clustering may indicate saturation, and intermediate separations may indicate typicality.

With continued reference to FIG. 1, processor 108 may be configured to compute a benefit score for each positioning signal 140 based on the comparison between each positioning signal 140 and the descriptive content 132. A "benefit score" as described in this disclosure refers to information indicating whether an observed difference between a positioning signal 140 and descriptive content 132 is likely to be advantageous, neutral, or disadvantageous for the intended audience and use context. The benefit score may be derived from category-specific directionality policies (for example, "lower response time is better," "higher verified outcomes are better," "higher fees may be worse"), combined with evidence quality (recency, source authority, corroboration), clarity and specificity (presence of concrete numbers, venues, timeframes), and audience relevance (jurisdiction and practice alignment). For qualitative categories, processor 108 may assess whether a claim is supported by verifiable artifacts (e.g., case citations, awards, third-party ratings) and penalize vague or boilerplate statements that are common in the cohort. For quantitative categories, processor 108 may evaluate the magnitude and reliability of the delta relative to cohort baselines and may adjust for sample size, dispersion, and outlier risk. In one or more embodiments, processor 108 may map inputs to a signed or labeled outcome (e.g., positive/neutral/negative) and, optionally, a confidence associated with that outcome. Category policies can include thresholds that distinguish small, non-actionable differences from meaningful advantages (e.g., improvements smaller than a defined band are treated as neutral). Favorability can also be conditioned on compliance and risk signals (claims that raise regulatory or ethical concerns, or that conflict with published policies, may be assigned a negative benefit score regardless of contrast magnitude. Where descriptive content 132 reveals that a strongly contrasted claim is unpopular or detrimental within the cohort (for example, longer contract terms, high retainer requirements), the processor 108 may classify the benefit as negative even when distinctiveness is high.

With continued reference to FIG. 1, system may filtering based on the benefit score by excluding or down-weighting contrast scores 136 associated with negative benefit. Filtering can be implemented through hard thresholds (e.g., discarding any signal whose benefit score is negative or whose confidence falls below a minimum) or through soft attenuation (e.g., reducing the weight of low-benefit signals in downstream rankings or profile construction). In one or more embodiments, processor 108 may maintain category-specific gates. For example, outcome claims may require corroborating evidence and minimum sample size before a positive benefit is assigned, whereas availability claims may allow lighter evidence with lower thresholds. Signals flagged as negative or low confidence can be routed to a quarantine queue for human review, deferred until corroborating inputs arrive, or retained only as disallowed items to prevent the LLM from amplifying them. The filtering process may also incorporate direction-aware guards to prevent "distinct but undesirable" information from surfacing. By way of non-limiting example, if the entity's positioning signal 140 indicates longer-than-cohort response times, the contrast may be high but the processor 108 may mark the benefit as negative and filter out the associated contrast score 136. Similarly, if a financial claim is unique but implies higher client cost without offsetting value, system 100 may classify the benefit as negative and suppress the signal. In one or more embodiments, benefit scoring and filtering may operate iteratively. As new descriptive content 132 is crawled or as the entity updates its inputs, processor 108 may refresh cohort baselines and re-evaluates benefit scores. Previously filtered signals may re-enter consideration if conditions change (e.g., response times improve, additional evidence is added). Conversely, signals that lose evidence or drift below thresholds are demoted or removed. By computing a benefit score from category-aware comparisons and then filtering out contrast scores 136 associated with negative benefit, the system ensures that downstream components (such as differentiator profile 144 encoding and LLM conditioning) are guided by differences that help rather than harm, thereby improving the accuracy and practical usefulness of generated outputs.

With continued reference to FIG. 1, processor 108 may be configured to generate benefit scores by comparing positioning signals 140 to established baselines or to cohort averages derived from descriptive content 132 within the same descriptive class 124. Baselines can be global (class-wide), stratified (e.g., by jurisdiction, language, or firm-size band), or time-bounded (e.g., last 12 months) to reflect current market conditions. By way of non-limiting example, an established baseline may include a 40% trial success rate for a given matter type in a specific jurisdiction; a positioning signal 140 indicating a materially lower success rate may receive a low benefit score because the observed difference is disadvantageous relative to the cohort. Conversely, a positioning signal 140 indicating a higher-than-baseline success rate may receive a high benefit score, reflecting a favorable variance. For non-numeric categories, baselines may capture prevalence (e.g., proportion of firms advertising 24/7 intake, multilingual coverage, or trial-first orientation); signals that assert a rare, audience-valued attribute may receive higher benefit scores when corroborated by evidence. In one or more embodiments, processor 108 may apply category-specific thresholds and policies to translate these comparisons into benefit scores. Thresholds can suppress inconsequential differences (e.g., variations within a tolerance band are scored neutral) and can enforce minimum evidence requirements (e.g., outcome claims require a minimum number of cases or independent citations). In one or more embodiments, processor 108 may also incorporate data quality factors (such as recency, source authority, and extraction confidence) such that stale or weakly supported signals are down-weighted even if numerically favorable. Benefit scores can be encoded as positive/neutral/negative labels or as signed magnitudes with associated confidence. Where policy or regulation dictates, certain attributes (e.g., fee disclosures) may be penalized or capped regardless of distinctiveness, ensuring compliance.

With continued reference to FIG. 1, processor 108 may filter out positioning signals 140 associated with low or negative benefit scores to prevent downstream models from conditioning on claims that are likely to harm accuracy or market fit. Filtering may be implemented as a hard exclusion (signals below a threshold are removed) or as attenuation (signals are retained for audit but assigned negligible weight). In one or more embodiments, processor 108 may record provenance for each decision, including the baseline or cohort statistic consulted, the applicable thresholds and policies, the sources used, and a brief rationale (e.g., "trial success rate below stratified median with low sample size"). Signals that receive high benefit scores may be promoted so that downstream components focus on information with demonstrable audience benefit. Benefit scores may be recomputed when baselines refresh or when new evidence arrives, allowing previously filtered signals to re-enter consideration upon improvement and ensuring that the system continuously emphasizes advantageous, well-supported differences. In one or more embodiments, benefit scores may be assigned values that indicate the direction of advantage relative to class baselines or cohort averages. For example, positive benefit scores may denote performance or attributes that are above average (or otherwise favorable under category policies), whereas negative benefit scores may denote below average or disadvantageous standing. In one or more embodiments, processor 108 may computes scores by comparing each positioning signal 140 to a matched baseline (e.g., medians, means, percentile bands, or prevalence rates within the same category, jurisdiction, and recency window) and applying category-specific directionality rules (for example, higher verified outcomes=better, lower response time=better, higher client cost=worse). Magnitude may reflect the size of the deviation, adjusted by sample size, dispersion, source authority, and recency. In one or more embodiments, processor 108 may be configured to filter out or down-weight contrast scores 136 associated with negative benefit scores, thereby preventing downstream components from emphasizing differences that are distinctive but unfavorable, while retaining or promoting contrast scores 136 paired with positive benefit scores for subsequent profile encoding and LLM conditioning.

With continued reference to FIG. 1, the processor 108 is configured to encode the contrast scores 136 into a differentiator profile 144 that, for each positioning signal 140, stores categorical tags and one or more weighted relationships. A "differentiator profile" as described in this disclosure is a machine-readable structure that is applied at inference to a machine learning model or a large language model in order to guide outputs of the machine learning model. The differentiator profile 144 may be represented as a typed object keyed by positioning signal 140 identifiers and includes, for each signal, categorical tags (e.g., authenticity, client impact, market distinction, geography, audience, channel, practice subtype), a weighted relationship derived from computed measures such as contrast and benefit, and/or the like. A "weighted relationship" as described in his disclosure is a numeric quantity, associated with a specific positioning signal 140. The weighted relationship may encode the relative importance, desirability, and strength of that positioning signal 140 for a given entity and use context. The weighted relationship can be a scalar per signal, a small vector when a signal has structured subcomponents (e.g., magnitude and recency), or a tensor capturing interactions among signals (e.g., trial orientation× catastrophic injury). Typical constraints may be applied so that weights are bounded, interpretable, and comparable, such as normalization to a fixed range, non-negativity where appropriate, optional sum-to-one constraints within a tag family, and effective dating for version control. Each weighted relationship may carry a confidence value reflecting the reliability of the underlying evidence and the stability of the cohort baseline that produced it. In one or more embodiments, weighted relationships may be generated from positioning-signal attributes and their associated contrast scores 136 and benefit scores using deterministic mappings, preference capture, and outcome-informed learning, alone or in combination. Deterministic mappings may derive initial weights directly from policy (e.g., translating positive benefit with high contrast into higher weights, penalizing negative benefit, and applying category-specific floors for regulated claims. Preference capture converts human inputs) such as ordinal rankings of signals, pairwise comparisons, or channel priorities into a consistent weight vector with consistency checks. Outcome-informed learning adjusts or proposes weights based on historical performance (e.g., campaign lifts, conversion rates, survey resonance), fitting models that link past outcomes to signal presence and strength, then translating learned contributions into weights under regularization and monotonicity rules so that critical signals do not fall below policy minima. The system may combine these sources via weighted averaging or constrained optimization to produce final, auditable weighted relationships per positioning signal 140, each stored with provenance, policy version, and calibration notes.

With continued reference to FIG. 1, in one or more embodiments, weighted relationship may include a relative importance of each positioning signal 140. In one or more embodiments, weighted relationship may indicate how important one positioning signal 140 is over another. In one or more embodiments, weighted relationship may be calculated using contrast scores 136 and/or benefit scores. In one or more embodiments, higher contrast scores 136 may indicate stronger weightings that inform a machine learning model, while lower benefit scores may result in lower weighted relationships. In one or more embodiments, weighted relationships may indicate a relative importance of each positioning signal 140 and inform a downstream model such as a large language model as to which positioning signals 140 are most important. In one or more embodiments, weighted relationship may include a relative importance of each positioning signal 140 in comparison to others. For example, weighted relationship of all positioning signals 140 may total to 1 wherein each positioning signal 140 may be associated with a particular weighting based on their contrast score 136 and benefit score.

With continued reference to FIG. 1, differentiator profile 144 may include categorical tags. A "categorical tag" as described in this disclosure refers to a label or category associated with a positioning signal 140. In one or more embodiments, categorical tags may signify which grouping a positioning signal 140 belongs to. In one or more embodiments, categorical tags may be used in lieu of positioning signals 140 and inform a downstream model of a particular positioning signal 140. In one or more embodiments, differentiator profile 144 may include categorical tags for contrast scores 136 and/or weighted relationships in order to inform a downstream model which weighted relationship and/or which contrast score 136 belongs to which grouping. In one or more embodiments, each positioning signal 140 may include at least one weighted relationship indicating an important of positioning signal 140 and at least one categorical tag indicating a grouping in which positing signal belongs to. In one or more embodiments, each positioning signal 140 in the differentiator profile 144 may carry one or more categorical tags that indicate the category or facet to which the signal belongs (by way of non-limiting example, authenticity drivers, client-impact narratives, market-distinction factors, geography, practice subtype, audience segment, or channel) and one or more weighted relationships that encode the relative importance and desirability of that signal for the entity and intended use context. Weighted relationships may further include confidence and freshness indicators, effective dates, and provenance references to the underlying evidence or sources that substantiated the signal. Categorical tags enable like-for-like organization and retrieval, while weighted relationships provide a numeric control surface for prioritization and gating.

With continued reference to FIG. 1, differentiator profile 144 may acts as a configuration layer for an already-trained downstream model, such as a large language model, thereby guiding the model's behavior without modifying its learned parameters. At inference, differentiator profile 144 can be applied to condition retrieval so that document and snippet selection is biased toward high-weight signals within the relevant categories constrain prompting through profile-aware prompt templates that inject prioritized signals and suppress negative-benefit or low-weight signals, bias attention or scaling within a pre-existing generation pipeline (e.g., by supplying attention masks, importance multipliers, or reranking preferences that elevate content aligned with higher-weight signals) and/or enforce thresholds and guardrails that exclude signals lacking sufficient evidence, recency, or compliance clearance. In this way, the differentiator profile 144 shapes both what the model "sees" and how strongly it attends to it, yielding outputs that reflect the entity's validated differentiators.

With continued reference to FIG. 1, differentiator profile 144 may encode operational rules for personalization, including channel-specific weights (e.g., different emphasis for ads versus long-form copy), audience-segment overrides (e.g., enterprise vs. consumer), and jurisdictional filters. During generation, the runtime may read the differentiator profile 144 to assemble a profile-conforming context package (containing high-weight positioning signals 140, representative evidence snippets, and category tags) and present it to the model via retrieval-augmented prompts or structured control tokens. Outputs produced under this process may be personalized to the entity, consistently highlight high-value differentiators, avoid saturated or low-benefit claims, and remain traceable back to the evidence and policy logic encoded in the differentiator profile 144.

With continued reference to FIG. 1, processor 108 may be configured to construct a differentiator profile 144 from a plurality of positioning signals 140 by assigning categorical tags to each positioning signal 140 and deriving weighted relationships that encode the relative importance and desirability of those signals for the entity and intended use context. In one or more embodiments, processor 108 computes weighted relationships for each positioning signal 140. A weighted relationship may include a numeric value (scalar, small vector, or tensor) that reflects how strongly the system should emphasize the signal during downstream retrieval and generation. In one or more embodiments, weights may be derived from contrast scores 136 (separation from cohort norms), benefit scores (directionality of advantage-positive, neutral, negative-optionally with magnitude and/or the like. Processor 108 may combine inputs via deterministic mappings (e.g., positive benefit+high contrast⇒high base weight; negative benefit⇒zero or attenuated weight), constrained optimization (maximize expected utility subject to policy minima/maxima), or outcome-informed learning (translate coefficients from models trained on historic performance into bounded weights). Weights may then be normalized to a consistent range (for example, [0,1] or 0-100), with optional class- or channel-specific sum-to-one constraints to preserve interpretability. In one or more embodiments, processor 108 may materialize differentiator profile 144 as a machine-readable object keyed by signal identifiers. For each positioning signal 140, differential profile stores the signal embedding reference (pointer to a vector index entry, if used), the set of categorical tags with confidences, one or more weighted relationships (e.g., overall emphasis weight; channel-specific weights; audience-specific overrides), and/or the like. Relationships among signals (such as supports, evidences, contradicts, generalizes, or specializes) may be represented as edges with their own weights to capture interactions (for example, "trial orientation" supported by "jury trials in last 24 months"). The resulting structure provides both content (what to say) and control (how strongly to emphasize it). At inference time, the differentiator profile 144 acts as a configuration layer for an already-trained model (e.g., an LLM) without altering its learned parameters. In one or more embodiments, processor 108 may transmit differentiator profile 144 to a machine learning model and/or large language model at runtime in order to personalize and/or configure outputs without retraining the model.

With continued reference to FIG. 1, processor 108 is configured to encode the contrast score 136 into a differentiator profile 144 containing at least one categorical tag and at least one weighted relationship for each positioning signal 140 by converting the result of the entity-vs-cohort comparison (the contrast score 136) into a machine-readable profile entry for that positioning signal 140. For each signal, the processor 108 attaches categorical tags that identify the signal's category or facet (e.g., authenticity driver, client-impact narrative, market-distinction factor, practice subtype, geography, audience, channel) and derives one or more weighted relationships. The weighted relationship is computed from the contrast score 136 (e.g., rarity/separation from the cohort) and, where available, a benefit/favorability determination and evidence quality (recency, source authority, extraction confidence). The result is a normalized weight (or small vector) that is bounded, interpretable, and comparable across signals, optionally with effective dates, confidence, and policy references.

With continued reference to FIG. 1, in one or more embodiments, differentiator profile 144 may already be stored in database 116 and/or created on previous iteration of the processing, previous day, month and/or the like. In one or more embodiments, processor 108 may receive an existing differentiator profile 144 associated with entity from database 116. In one or more embodiments, differentiator profile 144 may reside in a database 116, object store, graph store, or versioned registry. Differentiator profile 144 may contain positioning signals 140, categorical tags, and weighted relationships created earlier for the same entity. New input data 120 may arrive through questionnaires, updated website pages, meeting transcripts, reviews, or operational metrics. Processor 108 may evaluate the new information against the existing profile. If the evidence changes, processor 108 may updates one or more categorical tags and one or more weighted relationships for each affected positioning signal 140. Updates may include adding a tag, removing a tag, or changing a tag's confidence. For example, if new materials show Spanish-language intake, the processor 108 adds a language: Spanish tag to relevant signals. If a practice page is retired, a practice subtype tag may be removed or downgraded. Weighted relationships may also be recomputed. If recent case results show faster response times than the cohort, the availability/response-time signal receives a higher weight. If new data reveal a drop in verified outcomes, the results/impact signal weight is reduced or set below a policy threshold. If a claim is found to be non-compliant in a jurisdiction, the weight may be set to zero and the signal flagged as do-not-use. In one or more embodiments, processor 108 can create new positioning signals 140 when novel evidence appears. For example, a press release announcing a large verdict triggers a new financial results: verdict amount signal with appropriate tags and an initial weight. Conversely, stale or contradicted signals can be deprecated. A prior "24/7 intake" claim may be downweighted if current pages list reduced hours. Profile updates may be channel- or audience-specific. If A/B tests show that a "trial-first" message lifts ad performance, the ads weight for the trial orientation signal increases, while the long-form weight remains unchanged. If enterprise buyers prefer a different emphasis, the processor 108 raises weights for signals tagged audience: enterprise. In one or more embodiments, processor 108 may receive testing differentiator profile 144 and update one or more categorical tags and one or more weighted relationships within the existing differentiator profile 144 for each positioning signal 140.

With continued reference to FIG. 1, processor 108 is configured to modify a generation behavior of a base LLM 148 using the differentiator profile 144 as a conditioning input. A "conditioning input" as described in this disclosure is a control package provided to an already-trained model at inference time to influence outputs of the model. In one or more embodiments, conditioning input may influence which information the model attends to, how it prioritizes that information, and what forms of output it is permitted to produce, without changing the model's learned parameters. In one or more embodiments, conditioning input may modify a generation behavior of base LLM 148, such that outputs of base LLM 148 may differ due to differing conditioning inputs. In one or more embodiments, a base LLM 148 may have differing outputs and/or differing generation behaviors based on differing conditioning inputs. In one or more embodiments, differentiator profile 144 may function as an authoritative source for this control package by supplying positioning signals 140, categorical tags, and weighted relationships that specify which signals are in-scope, how important they are, and under what constraints they should be used. In one or more embodiments, processor 108 assembles a profile-conforming context package from the differentiator profile 144 prior to generation. The package may include a ranked list of positioning signals 140 selected according to weighted relationships and requested tag families, representative evidence snippets linked to those signals. Profile-level rules such as minimum weights, exclusion flags, freshness thresholds, and channel-/audience-specific overrides and/or metadata required for traceability (profile version, timestamps, provenance identifiers). The context package may be supplied to the base LLM 148 as the conditioning input.

With continued reference to FIG. 1, at runtime, the conditioning input may be applied through one or more mechanisms. In one or more embodiments, conditioning input may be applied through retrieval conditioning. In one or more embodiments, during retrieval conditioning, processor 108 may use differentiator profile 144 to bias retrieval queries and re-rank candidates so that passages aligned with high-weight signals are preferentially inserted into the model's context window. Low-weight or disallowed signals may be filtered out before retrieval in one or more embodiments, conditioning input may be applied through prompt conditioning. In one or more embodiments, during prompt conditioning, processor 108 may construct profile-aware prompt segments (e.g., system or instruction blocks) that enumerate permitted signals, emphasize high-weight signals in priority order, and encode constraints (claims to avoid, compliance notes, required tone or audience). Negative-benefit or suppressed signals may be explicitly excluded. In one or more embodiments, processor 108 may perform feature and attention conditioning. In one or more embodiments, the runtime applies importance multipliers, attention masks, or scaling factors linked to categorical tags and weighted relationships so that tokens associated with higher-weight signals are amplified relative to others during internal attention computations. In one or more embodiments, processor 108 may perform logit conditioning wherein processor 108 may apply logit-bias tables or constrained decoding masks derived from the differentiator profile 144 to steer generation toward vocabulary and constructions that realize high-weight signals and away from phrases that contradict profile rules or disallowed signals. In one or more embodiments, processor 108 may perform guided decoding and structure conditioning wherein the runtime enforces output schemas or pattern constraints (e.g., headline→proof→client-impact) keyed to tag families so that generated text consistently reflects the differentiator profile's structure and emphasis. In one or more embodiments, differentiator profile 144 may serve as the run-time control surface that conditions the base LLM's behavior, ensuring that generated outputs are personalized to the entity, emphasize high-weight, evidence-backed positioning signals 140, exclude negative-benefit or non-compliant content, and remain traceable to the underlying profile and evidence.

With continued reference to FIG. 1, system 100 may include a large language model (LLM). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database 116. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet," then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data 120, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data 120. In the case of natural language processing, input data 120 may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention, self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data 120 is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input to other words. As a non-limiting example, an LLM may learn to associate the word "you," with "how" and "are." It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word to be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with an entity such as request associated with an entity to generate prompts, discussions, articles and/or the like.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, system 100 may include and/or be communicatively connected to a base LLM 148. A "base LLM" as described in this disclosure refers to a large language model that has been generally trained. In one or more embodiments, base LLM 148 may include an LLM that has been trained for a variety of tasks and not specific tasks. For example, and without limitation, base LLM 148 may be configured to generate articles and/or solve mathematical computations. In one or more embodiments, the differentiator profile 144 functions as an inference-time conditioning input that obviates the need to retrain or fine-tune base LLM 148. Because differentiator profile 144 encodes which positioning signals 140 to emphasize (via weighted relationships) and how they are categorized (via categorical tags), the runtime can steer the base LLM 148 attention, retrieval, prompting, and decoding toward profile-conforming content without altering model parameters. This enables zero-training personalization such that a single, general-purpose model may serve many entities, while per-entity behavior is governed entirely by the externally supplied profile.

With continued reference to FIG. 1, system 100 may employ a profile-to-context compiler that translates the differentiator profile 144 into concrete control artifacts such as prompt segments, retrieval filters, attention masks, logit-bias tables, and decoding constraints. These artifacts may be injected at inference as the conditioning input and may be cacheable and hot-swappable, such that, updating a weight or adding/removing a tag yields a new compiled package that takes effect on the next request, with no checkpointing or gradient steps. Because the compiler is deterministic with respect to a given profile version, the resulting behavior is reproducible and auditable across runs. The use of the differentiator profile 144 as conditioning input further supports multi-tenant and cold-start scenarios. New entities can be onboarded by generating an initial profile from their input data 120 and class cohort, immediately unlocking personalized generation without waiting for training cycles. A single serving cluster can host the base model for all tenants; per-request conditioning ensures that outputs reflect each tenant's profile while isolating data and policies. This design reduces inference latency (no model swap or load) and operational cost (no per-tenant fine-tunes to train, store, or manage). In one or more embodiments, differentiator profile 144 being used as a conditioning can also allow for rapid policy and compliance updates. Jurisdictional or channel-specific constraints can be expressed as tags and weights in the differentiator profile 144; when regulations change, operators adjust the profile, and the new constraints are immediately enforced at generation time. Profile variants can be A/B tested by routing identical prompts through different conditioning inputs and comparing downstream metrics, again without touching the base model. Rollbacks are trivial: revert to a prior profile version to restore the previous behavior. Because personalization occurs through an externalized profile, system can implement safety and quality guardrails at the same layer. Negative-benefit or low-confidence signals may be encoded with zero or suppressed weights and thus cannot be amplified by the base model. Required signals (e.g., proof-led claims) can be marked with minimum weights or "must-include" tags, causing the runtime to enforce coverage through guided decoding or reranking, while disallowed claims are excluded by profile-derived masks. The result is consistent, policy-compliant generation driven by profile data rather than ad-hoc prompt engineering.

With continued reference to FIG. 1, in one or more embodiments, treating differentiator profile 144 as the sole conditioning input may enable continuous optimization loops without retraining. As new contrast and benefit scores are computed from fresh cohort content and outcomes, weights in the profile are updated and instantly reflected in generation. Serving metrics (engagement, conversion, human feedback) can be fed back to adjust weights via outcome-informed learning, creating a closed-loop control system around a stable base model. In one or more embodiments, differentiator profile 144 may serve as a first-class control plane that replaces model training for personalization, delivering faster iteration, lower cost, stronger governance, and outputs that reliably align with the entity's validated differentiators.

With continued reference to FIG. 1, processor 108 is configured to generate, by the base LLM 148 conditioned on the differentiator profile 144, one or more differentiator outputs 152. A "differentiator output" as described in this disclosure refers to an output of a large language that is personalized specifically to entity. In one or more embodiments, differentiators output may highlight the entity's validated uniqueness in form factors appropriate to a target channel or audience. Non-limiting examples may include headlines and subheads, value propositions, positioning statements, elevator pitches, website hero copy, practice-area page intros, paid-media ad variants, call scripts, email subject lines and bodies, FAQ answers, social captions, meta descriptions, award submissions, executive bios, case-study summaries, and briefing notes. In one or more embodiments, differentiator outputs 152 are entity-specific such that they incorporate facts and signals selected from the differentiator profile 144 (e.g., trial orientation, response-time commitments, multilingual intake, representative outcomes, unique process steps, geography, fee model), expressed in language consistent with the entity's brand tone and the constraints recorded in the profile. In one or more embodiments, processor 108 may receive an entity-specific request that initiates generation. An "entity-specific request" as described in this disclosure is an instruction or prompt indicating a desired outputs from an LLM. Entity-specific request can include, without limitation: channel and format (e.g., "two 90-character ad headlines," "homepage hero section," "LinkedIn post"), audience segment (e.g., enterprise buyer, consumer plaintiff, referral partner), geographic or jurisdictional scope, practice subtype, required inclusions (e.g., mention multilingual support), prohibited claims, tone and style guidance (e.g., authoritative, empathetic, plain-language), reading level targets, and call-to-action preferences. In one or more embodiments, entity-specific request may also specify performance constraints (e.g., character limits), compliance flags, freshness windows, and references to evidence to be surfaced or linked. In one or more embodiments, entity-specific request may include a request to generate an article, a blog post, interview questions, a social media post and/or the like. In one or more embodiments, entity-specific request may include any prompt received by and/or associated with entity.

With continued reference to FIG. 1, upon receipt of the entity-specific request, the runtime assembles the conditioning input from the differentiator profile 144, selecting and ordering positioning signals 140 according to weighted relationships and categorical tags that match the requested channel, audience, and scope. High-weight, policy-compliant signals are elevated; suppressed or negative-benefit signals are excluded. The conditioning input may include: a ranked list of signals, brief evidence snippets, channel-specific emphasis multipliers, required/forbidden claims, tone constraints, and jurisdictional gates. This package may be provided to the base LLM 148 at inference without modifying model parameters. In one or more embodiments, the base LLM 148 produces differentiator outputs 152 that implement the request while adhering to the differentiator profile 144. For example, given a request to draft a practice-area page intro for a personal-injury plaintiff firm in a specified city, the LLM emphasizes trial orientation, rapid response, and representative outcomes if those signals carry the highest weights, and it avoids saturated boilerplate that the profile has down-weighted. For paid ads, the LLM may generate multiple variants that each foreground a distinct high-weight signal to preserve diversity (e.g., one variant focused on 24/7 intake; another on bilingual support), while respecting character limits and channel policies. For long-form artifacts, the LLM can structure content as profile-aware sections (headline→proof-point→client-impact narrative) so that claims are supported by excerpts or references indicated by the profile. In one or more embodiments, differentiator outputs 152 can be parameterized by channel and audience. The differentiator profile 144 may provide channel-specific weights (e.g., stronger emphasis on concise proof for ads; richer narratives for case studies) and audience overrides (e.g., enterprise buyers prefer process reliability; consumers prefer response time and empathy). The conditioning input applies these channel and audience modifiers so that one profile powers many tailored outputs without retraining. Where jurisdictions impose compliance constraints, the profile's tags and rules prevent prohibited phrasing, require disclaimers, or limit certain claims; the LLM enforces these constraints at generation through prompt instructions, decoding masks, and post-generation checks. In one or more embodiments, the generation process may be iterative. Feedback from human reviewers, campaign metrics, or user interactions can be attached to outputs and fed back to adjust weighted relationships in the differentiator profile 144 (e.g., uplift a signal that consistently improves performance; down-weight one that underperforms), enabling continuous improvement without retraining the base model. Profile updates take effect on subsequent requests, enabling rapid adaptation to market changes, newly crawled competitor claims, or updated internal evidence. In one or more embodiments, differentiator outputs 152 may include style and tone adaptation. The entity-specific request or the profile may encode brand voice (e.g., plain-spoken, litigation-forward, compassionate), reading level requirements, and terminology preferences. The LLM may use these cues to render outputs that sound like the entity, not generic text, while still centering high-weight differentiators. When multiple languages are supported, the profile indicates language coverage and tone adjustments per locale; the LLM generates localized variants aligned to the same validated signals. In one or more embodiments, differentiator outputs 152 provide not only entity-specific personalization but also assured contrast relative to peers or entities within the same descriptive class 124. During generation, the runtime consults the differentiator profile's contrast and benefit informed weights and enforces minimum distinctiveness thresholds per category (e.g., trial orientation, response time, multilingual intake) so that selected claims materially exceed cohort baselines or represent rare, audience-valued attributes. Where a candidate output relies primarily on saturated or boilerplate claims, system demote or reject that candidate and prompts regeneration with stronger emphasis on high-contrast positioning signals 140. To operationalize contrast, processor 108 may apply cohort-aware decoding constraints. For example, the runtime can penalize phrases and constructions that match near-neighbor language commonly observed in descriptive content 132 from competitors (as tracked in the vector index and n-gram inventories), while boosting lexicon and structures associated with the entity's high-weight signals. Template suppression removes site-wide boilerplate patterns detected during crawling, preventing the model from reproducing language that is prevalent across competitor pages. These controls act in parallel with personalization cues, ensuring outputs are both on-brand and differentiated. In one or more embodiments, processor 108 is configured to transmit, to the base LLM 148, an entity-specific request and receive, from the base LLM 148, the one or more differentiator outputs 152.

With continued reference to FIG. 1, in one or more embodiments, processor 108 may be configured to generate a resonance score 160 indicative of a predicted response for each differentiator output 152. A "resonance score" as described in this disclosure is an indicator of an expected human reaction with respect a given differentiator output 152. In one or more embodiments, resonance score 160 may include information such as whether a differentiator output 152 is expected to engage, persuade, or otherwise achieve a desired reaction within a specified audience and channel context. The resonance score 160 can be a scalar value on a bounded scale (e.g., 0-1 or 0-100), a vector of subscores (e.g., relevance, clarity, credibility, distinctiveness, action propensity), or a tuple combining a numeric score with a categorical label (e.g., high, medium, low) and a confidence value. The score may also include audience-segment annotations (e.g., consumer plaintiff, referral partner, enterprise GC), jurisdictional applicability, and channel conditions (e.g., ad vs. long-form), thereby expressing for whom and where the output is likely to perform well. In one or more embodiments, resonance scoring may include consideration of content-intrinsic features and contextual features. Content-intrinsic features may include lexical and semantic alignment to high-weight positioning signals 140 from the differentiator profile 144; presence of proof-led elements (e.g., quantified results, dates, venues); clarity (readability grade, syntactic simplicity); specificity (concrete facts vs. vague language); tone adherence (brand voice, empathy for consumer audiences, formality for enterprise); and/or compliance markers. Contextual features may include audience pain-point match (derived from prior transcripts or survey data), channel constraints (character limits, format requirements), competitive saturation (overlap with cohort language), and recency of supporting evidence. The resonance score 160 can be computed using learned models, heuristic ensembles, or hybrid approaches. Non-limiting examples include gradient-boosted trees, calibrated logistic/ordinal regressors, transformer-based relevance scorers, and cross-encoders that jointly encode the differentiator output 152 with audience descriptors to predict response likelihood. Heuristic components may contribute interpretable subscores (e.g., readability, evidence density, prohibited-phrase penalties), which are then fused with model predictions. Scores are calibrated on held-out data (e.g., Platt scaling, isotonic regression) so that a given value corresponds to a consistent empirical likelihood of positive response for the specified audience and channel. In one or more embodiments, the resonance score 160 may be audience-aware and channel-aware. Processor 108 may condition a scorer on declared audience facets (jurisdiction, language, sophistication level) and channel parameters (paid search, social, website, email). For example, an output with dense proof may score higher for a referral partner audience on a landing page, while a concise benefits-first variant may score higher for consumer plaintiffs in a paid ad. Where multiple audiences are relevant, system may compute per-audience resonance vectors and retain both the maximum and a coverage measure indicating how broadly the output is expected to resonate.

With continued reference to FIG. 1, processor 108 may use the resonance score 160 to rank, filter, and select among multiple candidate differentiator outputs 152. Outputs scoring below a minimum resonance threshold (globally or per audience/channel) can be rejected or returned for regeneration with tighter conditioning (e.g., stronger emphasis on high-weight signals, improved clarity). Outputs above threshold can be reranked so that the highest predicted impact is selected for deployment. In one or more embodiments, resonance score 160 may also influences diversity selection, favoring a slate of outputs that collectively maximize resonance across target segments while minimizing redundancy.

With continued reference to FIG. 1, resonance score 160 may be generated using a machine learning model, such as any machine learning model as described in this disclosure. In one or more embodiments, generating the resonance score 160 may include applying a resonance machine-learning model that has been trained on training data containing a plurality of historical differentiator outputs 152 correlated to a plurality of historical responses. In one or more embodiments, historical differentiator outputs 152 may include prior historical outputs. In one or more embodiments, historical differentiator outputs 152 may include prior profile-conditioned artifacts (e.g., ads, headlines, landing-page copy, email subject lines, long-form sections) generated for one or more entities and preserved with their creation context. Historical responses may include prior audience interaction and outcome signals observed after publication, including, without limitation, impressions, click-through rate, dwell time, scroll depth, form starts and completions, call volume, booked consultations, sentiment or helpfulness ratings, human review scores, and downstream conversion or revenue attribution where available. Each training example may be indexed by audience and channel context (e.g., geography, language, persona, surface), timestamps, and the differentiator profile 144 version active at generation. The training data can include both content-intrinsic features and contextual features derived from the historical differentiator outputs 152 and their deployment metadata. Content-intrinsic features may capture alignment to high-weight positioning signals 140 (coverage and emphasis), evidence density (presence of concrete facts, dates, venues, amounts), clarity and readability measures, tone and style markers relative to brand guidance, and overlap with cohort boilerplate. Contextual features may encode channel constraints (character limits, placements), audience segment descriptors, jurisdictional flags, recency of supporting evidence, competitive saturation at time of deployment, and campaign controls (budget, bid strategy) to disentangle creative quality from delivery mechanics. The training pipeline may also attach provenance (profile ID, signal IDs realized in the output, suppression rules triggered) to support audit. In one or more embodiments, the resonance machine learning model 156 is realized as a supervised learner that maps the featurized differentiator output 152 and its context to a resonance target. The target can be continuous (e.g., expected lift, predicted conversion probability), ordinal (e.g., low/medium/high impact), categorical (e.g., will/will not exceed threshold), or vector-valued (e.g., subscores for relevance, clarity, credibility, distinctiveness, action propensity). Suitable models include calibrated gradient-boosted decision trees, linear or logistic/ordinal regressors with regularization, transformer-based scorers that cross-encode the output with audience descriptors, and learning-to-rank architectures when the objective is to order multiple candidates for the same request. Loss functions and evaluation metrics are selected to match the target (e.g., log loss, ordinal loss, pairwise ranking loss; AUC, average precision, NDCG), with calibration applied so predicted scores align with empirical rates. In one or more embodiments, resonance pipeline supports continuous learning. As new live responses arrive, system may log outcome data linked to the exact differentiator outputs 152, their conditioning inputs, and the active profile version. Periodically, or under drift detection, the model may be retrained or recalibrated with fresh data; performance changes are A/B validated before promotion. Feedback signals can also flow upstream to adjust weighted relationships in the differentiator profile 144—boosting signals that repeatedly correlate with high resonance for a segment, attenuating those that underperform—while leaving the base LLM's parameters untouched. In one or more embodiments, resonance machine learning model 156 may be iteratively trained in order to provide more accurate resonance scores 160. In one or more embodiments, resonance machine learning model 156 may receive one or more differentiator outputs 152 from base LLM 148 and generate a resonance score 160 for each differentiator output 152. In one or more embodiments, resonance score 160 may indicate which differentiator output 152 may be the most applicable to a particular audience. In one or more embodiments, base LLM 148 may be configured to generate multiple differentiator outputs 152, wherein resonance machine learning model 156 may generate resonance score 160. In one or more embodiments, base LLM 148 may be configured to output a single differentiator output 152, wherein a single resonance score 160 is created. In one or more embodiments, processor 108 may input differentiator output 152 and resonance score 160 into base LLM 148 in order to inform base LLM 148 to generate an updated differentiator output 152 in order to increase the received resonance score 160. In one or more embodiments, this process may be continuous until resonance machine learning model 156 generates a resonance score 160 that surpasses a particular threshold.

With continued reference to FIG. 1, system may include a user interface and/or a graphical user interface 164. For the purposes of this disclosure, a "user interface" is a means by which a user and a computer system interact; for example, through the use of input devices and software. A user interface may include a graphical user interface 164 (GUI), command line interface (CLI), menu-driven user interface, touch user interface, voice user interface (VUI), form-based user interface, any combination thereof, and the like. In one or more embodiments, user interface may be accessed using a computing device distinct from and communicatively connected to processor 108, such as a smartphone, tablet, laptop, or other remote terminal operated by the user. In one or more embodiments, user interface may include a graphical user interface 164. A "graphical user interface," as used herein, is a graphical form of user interface that allows users to interact with electronic devices. In some embodiments, the GUI may include icons, menus, other visual indicators or representations (graphics), audio indicators such as primary notation, and display information and related user controls. A menu may contain a list of choices and may allow users to select from among them. A menu bar may be displayed horizontally across the screen, such as a pull-down menu. When an option is clicked, the pull-down menu may appear. The menu may also include context menus that appear upon performing specific actions (e.g., right-clicking). Files, programs, web pages, and the like may be represented using icons within the GUI. These icons may offer a fast and intuitive way to open documents, initiate tasks, or access various system features.

With continued reference to FIG. 1, in one or more embodiments, processor 108 is configured to display the one or more differentiator outputs 152 and their associated resonance scores 160 through a graphical user interface 164 (GUI). The GUI may be web-based or native and rendered on desktop or mobile devices. A workspace view can present a sortable and filterable list of differentiator outputs 152, each shown as a card or row containing: the generated text/artifact (e.g., headline, hero copy, email subject/body), the resonance score 160 with a primary indicator (numeric or labeled band such as high/medium/low), optional sub scores (e.g., relevance, clarity, credibility, distinctiveness, action propensity), a confidence indicator, and the profile version used at generation time. Cards may include badges for channel (ads, web, social, email), audience segment, jurisdiction, and language. In one or more embodiments, each card exposes provenance and traceability controls. A "View signals" action can expand a panel listing the positioning signals 140 realized in the output, with their categorical tags and weighted relationships, and links to the underlying evidence (e.g., source page, transcript span). Tooltips may summarize contrast and benefit determinations that justified each signal's inclusion and note any suppressed signals. A compact coverage meter can visualize how well the output reflects the top-weighted signals for the selected channel and audience. The GUI may include a comparison mode for side-by-side review of multiple candidates. Each column can show a candidate's text, resonance score 160, and sub scores, with deltas and highlights indicating which phrases drive differences (e.g., improved clarity, reduced boilerplate overlap). A re-rank button can invoke the resonance model to re-score after minor edits, and a lock control can freeze a favored candidate for export while additional variants are explored. For decision support, the interface can render visual analytics such as gauge widgets for overall resonance, sparklines for predicted performance by audience segment or channel, and heatmaps that map sub scores to realized signals. Filters allow users to constrain the view by minimum resonance, required tags (e.g., "trial orientation," "Spanish language"), jurisdiction, or freshness window. A what-if panel can preview the effect of hypothetical profile adjustments (e.g., increasing the weight of "24/7 intake") on candidate ranking without publishing a new profile version. Editing workflows may be supported through an inline editor that permits safe changes to the output text while displaying live resonance updates. As the user types, the GUI can surface remediation hints (e.g., "add dated proof," "simplify reading level," "avoid saturated phrasing") and show which hints, if addressed, are expected to increase the score. The editor may enforce channel constraints (character limits, required fields) and compliance guardrails tied to the differentiator profile 144 (e.g., disallowed claims are underlined with an explanation).

With continued reference to FIG. 1, GUI may include a review and governance panel. Such a panel can show the profile and model lineage (profile ID/version, resonance model ID, calibration set), the conditioning input snapshot provided to the base LLM 148, and audit logs for generation and scoring events. Role-based access controls can restrict who may publish, approve, or modify outputs, with status indicators (Draft, Pending Review, Approved, Published) and e-signature or checklist attestations where required. In one or more embodiments, GUI may implement continuity and monitoring views. A performance dashboard can overlay live metrics (CTR, conversion, dwell time) with the stored resonance predictions to validate calibration and highlight drift. Alerts notify users when cohort conditions change (e.g., a once-distinct claim becomes saturated) or when new evidence triggers a profile update that suggests regenerating high-impact assets. Through these interface elements, system 100 may present differentiator outputs 152 and resonance scores 160 in a clear, auditable, and actionable manner, enabling users to select, refine, and deploy content that is both personalized and meaningfully differentiated for their target audiences.

With continued reference to FIG. 1, In one or more embodiments, graphical user interface 164 may present a selection workflow that enables a user to review and choose among a set of candidate differentiator outputs 152. Each candidate is rendered with its primary resonance score 160, sub scores, confidence indicator, and realized positioning signals 140. The user may select one or more candidates via checkboxes or "pin" controls, compare them side-by-side, and mark selections as Approved, Needs Revision, or Rejected. An inline editor allows safe text edits; as the user types, the interface re-evaluates and recomputes resonance in real time so the user can observe how small changes (e.g., adding dated proof or simplifying phrasing) affect predicted audience response. Batch actions permit promoting a selected slate to downstream channels (e.g., ads, web, email) while preserving the associated resonance scores 160 and profile version for audit.

With continued reference to FIG. 1, in one or more embodiments, graphical user interface (GUI) may include an integrated chatbot system that provides an interactive conduit between the end user and the platform's components, including (without limitation) the base large language model (LLM), retrieval services, the differentiator-profile store, the resonance scoring service, and the crawl/contrast pipelines. The chatbot may present a conversational panel embedded within the GUI's workspace view and supports text, voice, and structured quick-actions. Messages exchanged through the chatbot are persisted with timestamps, user identity, and request context for auditability. The chatbot can accept natural-language, entity-specific requests (e.g., "Draft three ad headlines for Spanish-speaking plaintiffs in Miami") and translate them into structured calls that assemble the conditioning input from the entity's current differentiator profile and then invoke the base LLM to generate differentiator outputs. The chatbot can also explain how a response was produced by surfacing the positioning signals used, their categorical tags, the associated weighted relationships, and links to supporting evidence. Where applicable, the chatbot presents the resonance score and any subscores (e.g., relevance, clarity, distinctiveness), along with remediation hints (e.g., "add dated proof," "reduce reading level") so the user can iteratively refine the output in-chat. Chatbot system may be consistent with any chatbot system as described in this disclosure, such as in reference to at least FIG. 3.

Figure 2:
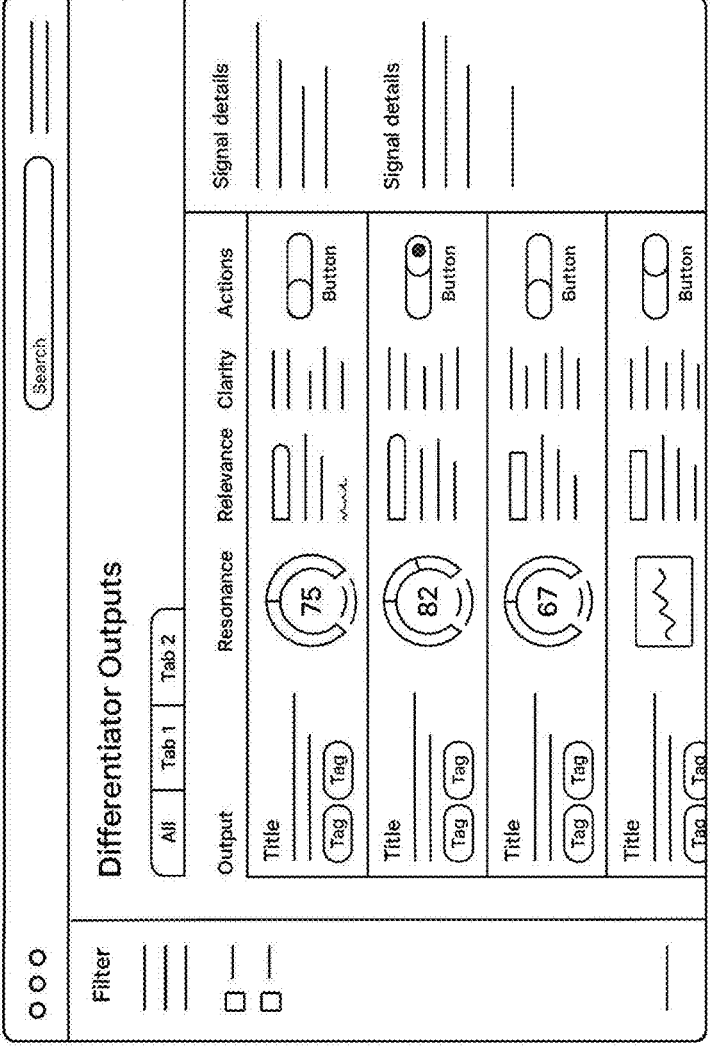
FIG. 2 illustrates an exemplary embodiment of a graphical user interface.

Referring now to FIG. 2, an exemplary embodiment of a graphical user interface 200 is described. In one or more embodiments, graphical user interface may be presented for viewing entity-specific differentiator outputs together with predicted audience resonance. The interface can display a header region showing the active entity identity, the applicable differentiator profile name and version, the selected channel and audience segment, the jurisdiction or locale, and a search field. Indicators can be shown to display whether the currently rendered outputs were generated under the latest profile. In one or more embodiments, the interface can display a filter and context region. This region can show controls and status for minimum resonance thresholds, subscores such as relevance, clarity, credibility, distinctiveness, and action propensity, tag families required or excluded, freshness windows, and compliance visibility. A segment selector can display the currently active audience persona or locale so that the user understands the context in which resonance is reported. In one or more embodiments, the interface can display a workspace of differentiator output cards. Each card can show the generated text or artifact appropriate to the selected channel, a primary resonance score as a numeric value or banded label, a confidence indicator, and a compact bar or meter rendering subscores. Each card can also display categorical tags realized by the output, a coverage meter indicating alignment to high-weight positioning signals from the active profile, and provenance badges that reveal the profile version and evidence sources associated with realized claims. In one or more embodiments, the interface can display an inline edit view associated with a chosen card. This view can show live updates of resonance while text is adjusted, including visual hints indicating which revisions are predicted to increase or decrease resonance. Channel constraints such as character limits can be displayed adjacent to the text, and compliance notes tied to the differentiator profile can be highlighted to show disallowed phrases or required disclaimers. In one or more embodiments, the interface can display a comparison view for multiple candidates. This view can show each candidate's text side by side, resonance scores and subscores, coverage meters, and highlights that call out phrase-level differences correlated with score changes. Summary deltas can be displayed to show which candidate better satisfies tag coverage or clarity targets. In one or more embodiments, the interface can display a performance dashboard overlaying live engagement and conversion metrics with stored resonance predictions. Visualizations such as gauges, spark lines, and heatmaps can be shown to relate subscores to realized signals, highlight calibration gaps, surface drift alerts when once-distinct claims become saturated, and suggest regeneration opportunities. Filters can be displayed to slice performance by audience, channel, jurisdiction, or profile version.

Figure 3:
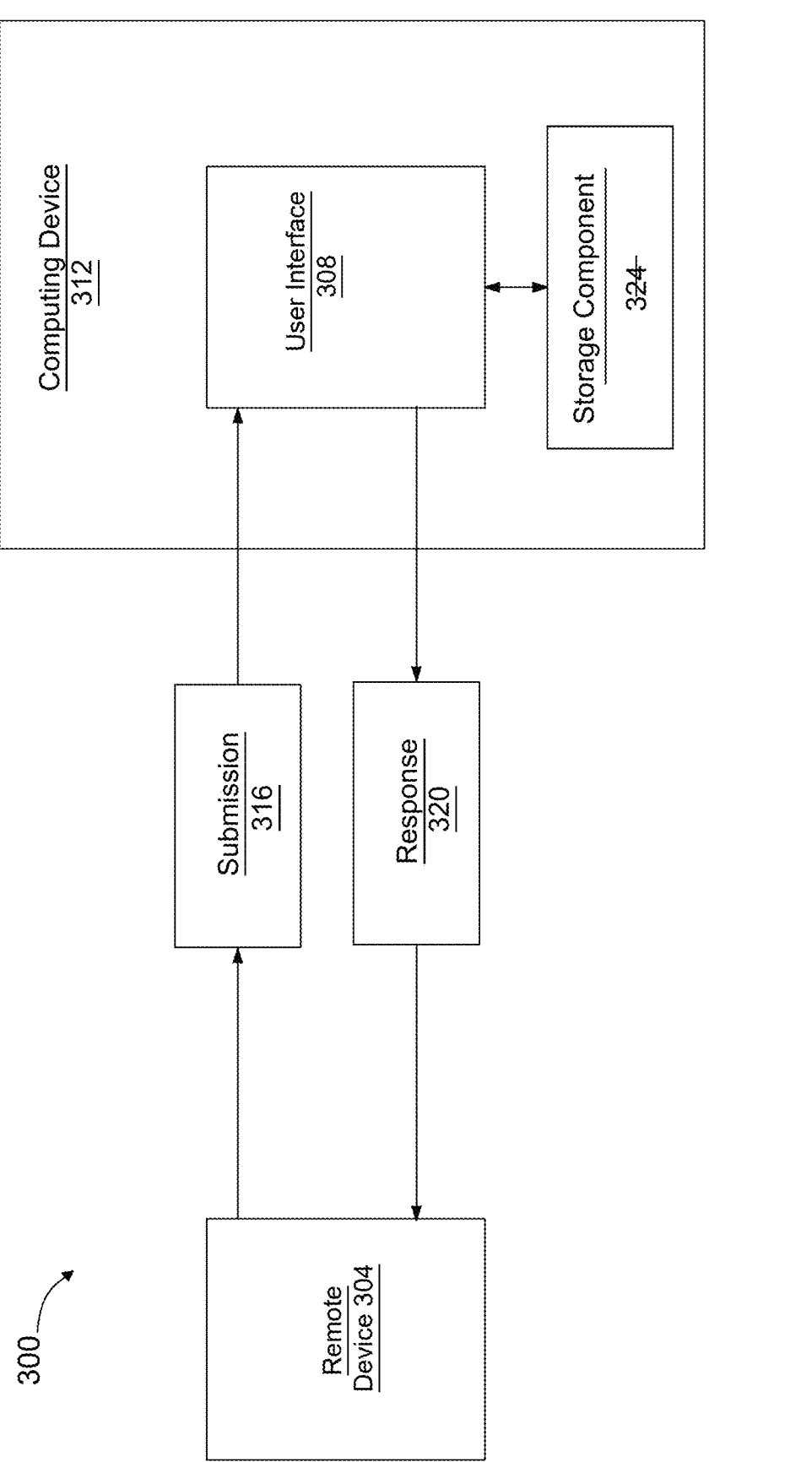
FIG. 3 is a block diagram of a user interface system.

Referring now to FIG. 3, a user interface system 300 is schematically illustrated. User interface system 300 may configure a computing device 312 to configure a remote device 304 to perform display, input, and output functions, without limitation of a user interface. According to some embodiments, a user interface 308 may be communicative with a computing device 312, such as computing device as described above, that is configured to operate a chatbot. In some cases, user interface 308 may be local to computing device 312. Alternatively or additionally, in some cases, user interface 308 may remote to computing device 312 and communicative with the computing device 312, by way of one or more networks, such as without limitation the internet. Alternatively or additionally, user interface 308 may communicate with user device using telephonic devices and networks, such as without limitation fax machines, short message service (SMS), or multimedia message service (MMS). Commonly, user interface 308 communicates with computing device 312 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 308 may conversationally interface using a chatbot, by way of at least a submission 316, from the user interface 308 to the chatbot, and a response 320, from the chatbot to the user interface 308. In many cases, one or both of submission 316 and response 320 are text-based communication. Alternatively or additionally, in some cases, one or both of submission 316 and response 320 are audio-based communication.

Continuing in reference to FIG. 3, a submission 316 once received by computing device 312 operating a chatbot, may be processed by circuitry and/or a processor, for instance and without limitation as described above. In some embodiments, processor processes a submission 316 using one or more of keyword recognition, pattern matching, and natural language processing. In some embodiments, processor employs real-time learning with evolutionary algorithms. In some cases, processor may retrieve a pre-prepared response from at least a storage component 324, based upon submission 316. Alternatively or additionally, in some embodiments, processor communicates a response 320 without first receiving a submission 316, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 308; and the processor is configured to process an answer to the inquiry in a following submission 316 from the user interface 308. In some cases, an answer to an inquiry present within a submission 316 from a user device may be used by computing device 104 as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 3, system may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics. As used in this disclosure, an "event handler graphic" is a graphical element with which a user of remote device may interact to enter data, for instance and without limitation for a search query or the like as described in further detail below. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to apparatus and/or circuitry.

In an embodiment, and further referring to FIG. 3, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic may be further configured to display the at least a prior session datum, for instance and without limitation auto-populating user query data from previous sessions.

With continued reference to FIG. 3, in one or more embodiments, users may utilize instances of user interface system 300 to exchange text messages with each other. User interface 308 may include functionality to configure each or any remote device to display a chat window. A chat window may include a window or field that displays text generated by one or more users and/or chatbot outputs, and/or a window or field for entry of textual data by a user; windows and/or fields for display and entry may be separate. An event handler graphic and/or event handler may transmit textual entries and/or display such entries, for instance and without limitation when a user "posts" such entries to make them visible to a chatbot and/or another user.

Figure 4:
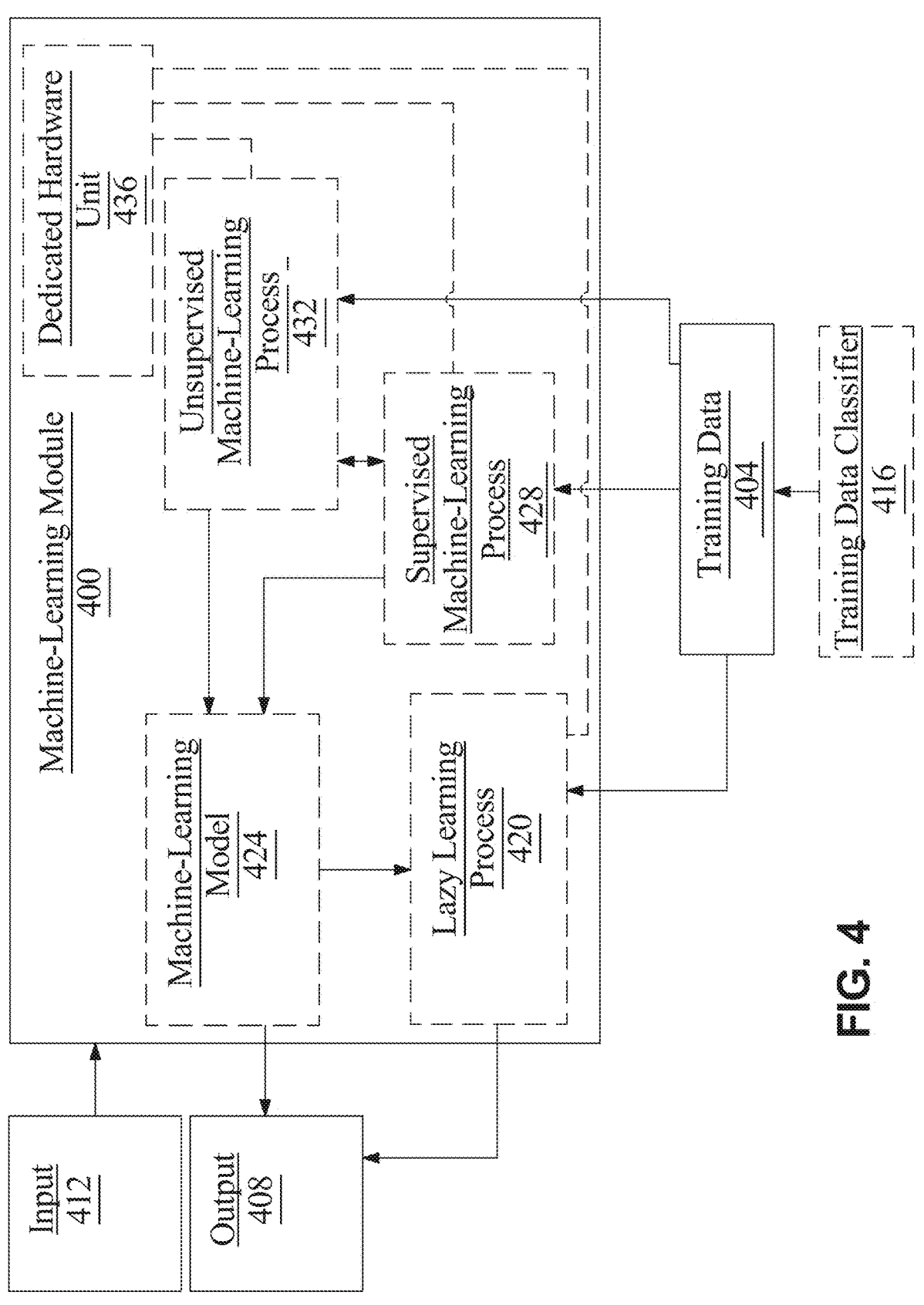
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include inputs such as differentiator outputs and/or descriptive content or the like as inputs and outputs may include descriptive class, resonance scores and/or the like as outputs.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories of differentiation outputs, such as for example, tone, audience, content, language and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - x_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as descriptive content, differentiator outputs and/or the like as described above as inputs, descriptive classes resonance as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 4, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 4, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any current or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
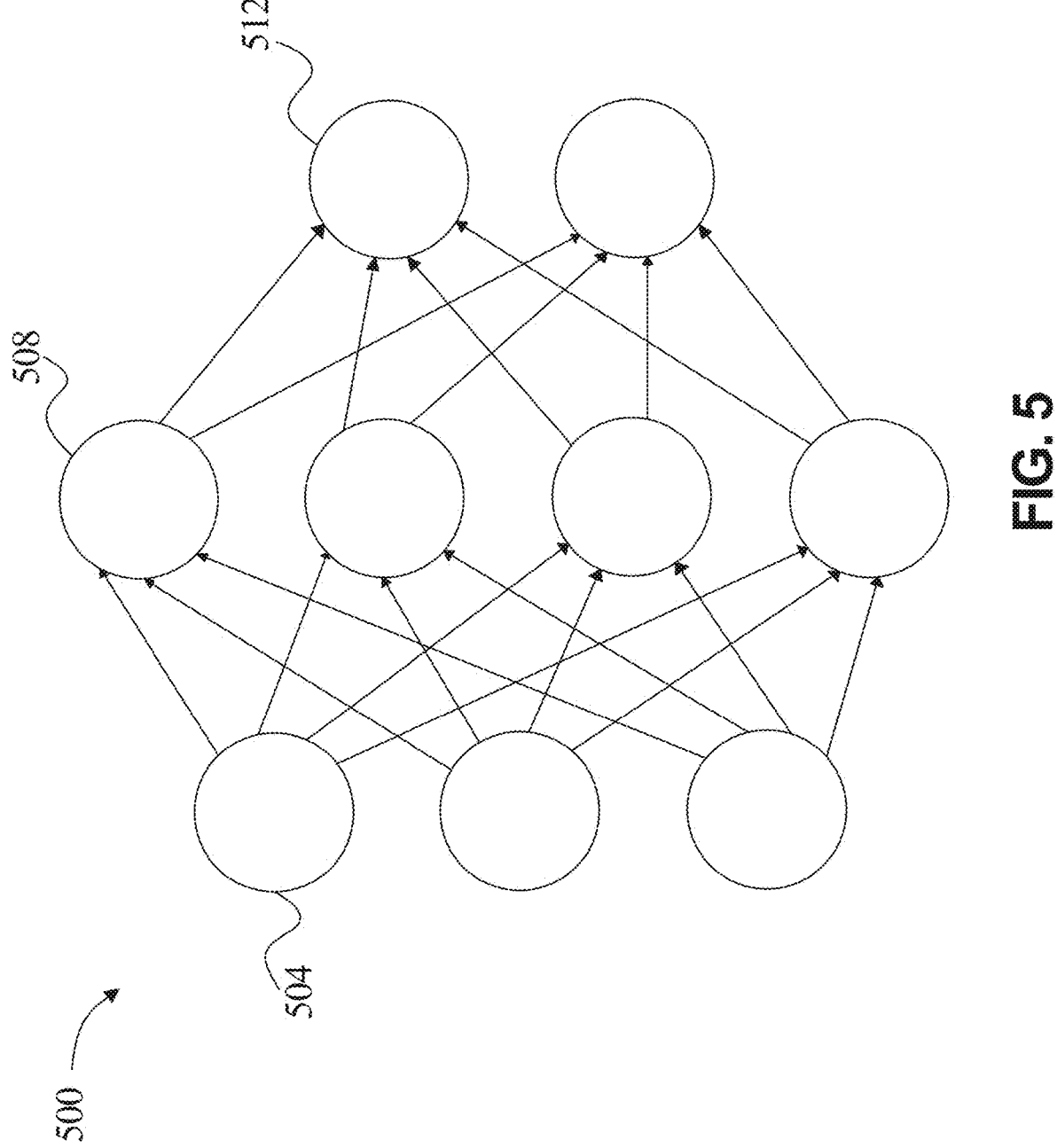
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
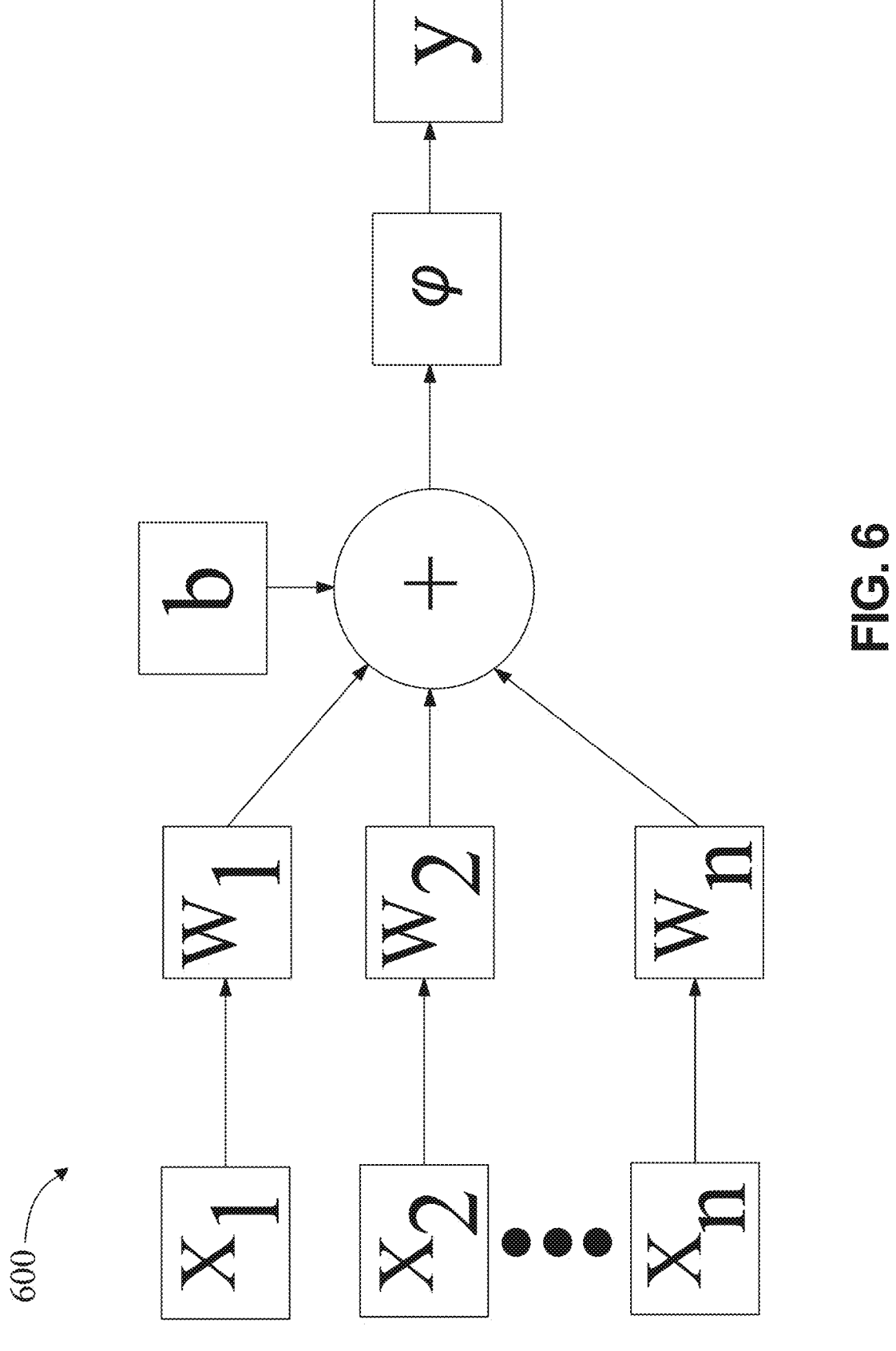
FIG. 6 is a block diagram of an exemplary embodiment of a node of a neural network.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as

64

$$f(x_i) = \frac{e^x}{\sum_i x_i}.$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, $\alpha$ is a parameter to set the learning rate, and $$\frac{dJ}{dw}$$

is the partial derivative of with respect to weight w.

Referring now to FIG. 7, a method 700 for Large Language Model (LLM) based differentiation is described. At step 705, method 700 includes, receiving, by at least a processor, input data associated with an entity. This may be implemented with reference to FIGS. 1-6 and without limitation.

With continued reference to FIG. 7, at step 710, method 700 includes classifying, by the at least a processor, the input data to a descriptive class. This may be implemented with reference to FIGS. 1-6 and without limitation.

With continued reference to FIG. 7, at step 715, method 700 includes commanding, by the at least a processor, an adaptive web crawler to retrieve descriptive content associated with the descriptive class. This may be implemented with reference to FIGS. 1-6 and without limitation.

With continued reference to FIG. 7, at step 720, method 700 includes extracting, by the at least a processor, a plurality of positioning signals from the input data associated with the entity. This may be implemented with reference to FIGS. 1-6 and without limitation.

With continued reference to FIG. 7, at step 725, method 700 includes generating, by the at least a processor, a contrast score for each positioning signal of the plurality of positioning signals by comparing the plurality of positioning signals to the descriptive content. This may be implemented with reference to FIGS. 1-6 and without limitation.

With continued reference to FIG. 7, at step 730 method 700 includes encoding, by the at least a processor, the contrast score into a differentiator profile including at least one categorical tag and at least one weighted relationship for each positioning signal. This may be implemented with reference to FIGS. 1-6 and without limitation.

With continued reference to FIG. 7, at step 735, method 700 includes modifying, by the at least a processor, a generation behavior of a base LLM using the differentiator profile as a conditioning input. This may be implemented with reference to FIGS. 1-6 and without limitation.

With continued reference to FIG. 7, at step 740, method 700 includes generating, by the base LLM conditioned on the differentiator profile, one or more differentiator outputs. This may be implemented with reference to FIGS. 1-6 and without limitation.

With continued reference to FIG. 7, in one or more embodiments, commanding the adaptive web crawler to retrieve the descriptive content includes transforming the descriptive content into a plurality of descriptive embeddings within a shared feature space and extracting the plurality of positioning signals from the input data associated with the entity includes transforming the input data into a plurality of signal embeddings representing the entity in the shared feature space such that each positioning signal includes a signal embedding within the shared feature space. In one or more embodiments, generating the contrast score for each positioning signal includes identifying a distance between each signal embedding and each descriptive embedding and generating the contrast score based on the distance. In one or more embodiments, classifying the input data to the descriptive class includes applying a multi-label classifier configured to output a confidence vector for each descriptive class of a plurality of descriptive classes and commanding the adaptive web crawler to retrieve the descriptive content includes triggering one or more class-specific crawl policies for the adaptive web crawler based on the descriptive content. In one or more embodiments, method 700 includes generating, by the at least a processor, a resonance score indicative of a predicted response for each differentiator output of the one or more differentiator outputs and displaying, by the at least a processor, the one or more differentiator outputs and the resonance score through a graphical user interface. In one or more embodiments, generating the resonance score includes generating the resonance score using a resonance machine learning model trained with training data including a plurality of historical differentiator outputs correlated to a plurality of historical responses. In one or more embodiments, the input data includes a meeting transcript. In one or more embodiments, generating one or more differentiator outputs includes transmitting, to the base LLM, an entity-specific request and receiving, from the base LLM, the one or more differentiator outputs. In one or more embodiments, encoding the contrast score into the differentiator profile includes receiving an existing differentiator profile associated with the entity and updating one or more categorical tags and one or more weighted relationships within the existing differentiator profile for each positioning signal. In one or more embodiments, generating the contrast score for each positioning signal includes computing a benefit score for each positioning signal based on the comparison between each positioning signal and the descriptive content and filtering out contrast scores associated with a negative benefit score. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
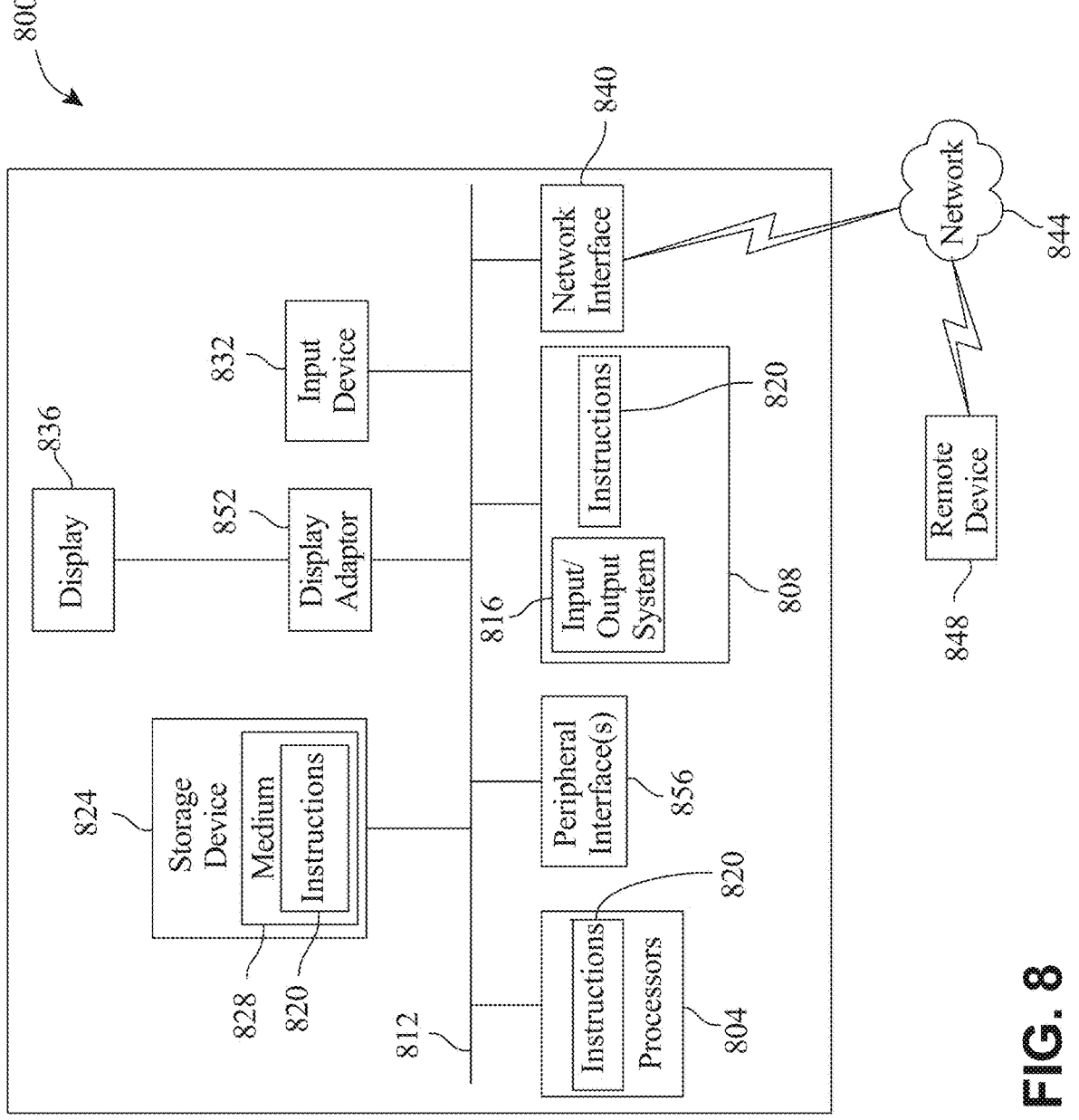
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, micro-processor, digital signal processor (DSP) and/or system on a chip (SoC) as described in this disclosure. A computing device may include, be included in, and/or communicate with a mobile device such as a mobile telephone or smart-phone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In one or more embodiments, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in one or more embodiments, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www-.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for Large Language Model (LLM) based differentiation, the system comprising:
a processor; and
a memory communicatively connected to the processor, the memory containing instructions configuring the processor to:
receive input data associated with an entity;
classify the input data to a descriptive class;
command an adaptive web crawler to retrieve descriptive content associated with the descriptive class;

extract a plurality of positioning signals from the input data associated with the entity;
generate a contrast score for each positioning signal of the plurality of positioning signals by comparing the plurality of positioning signals to the descriptive content;
encode the contrast score into a differentiator profile comprising at least one categorical tag and at least one weighted relationship for each positioning signal;
modify a generation behavior of a base LLM using the differentiator profile as a conditioning input; and
generate, by the base LLM conditioned on the differentiator profile, one or more differentiator outputs.

2. The system of claim 1, wherein:
commanding the adaptive web crawler to retrieve the descriptive content comprises:
transforming the descriptive content into a plurality of descriptive embeddings within a shared feature space; and
extracting the plurality of positioning signals from the input data associated with the entity comprises:
transforming the input data into a plurality of signal embeddings representing the entity in the shared feature space such that each positioning signal comprises a signal embedding within the shared feature space.

3. The system of claim 2, wherein generating the contrast score for each positioning signal comprises:
identifying a distance between each signal embedding and each descriptive embedding; and
generating the contrast score based on the distance.

4. The system of claim 1, wherein:
classifying the input data to the descriptive class comprises:
applying a multi-label classifier configured to output a confidence vector for each descriptive class of a plurality of descriptive classes; and
commanding the adaptive web crawler to retrieve the descriptive content comprises triggering one or more class-specific crawl policies for the adaptive web crawler based on the descriptive content.

5. The system of claim 1, wherein the processor is further configured to:
generate a resonance score indicative of a predicted response for each differentiator output of the one or more differentiator outputs; and
display the one or more differentiator outputs and the resonance score through a graphical user interface.

6. The system of claim 5, wherein generating the resonance score comprises generating the resonance score using a resonance machine learning model trained with training data comprising a plurality of historical differentiator outputs correlated to a plurality of historical responses.

7. The system of claim 1, wherein the input data comprises a meeting transcript.

8. The system of claim 1, wherein generating the one or more differentiator outputs comprises:
transmitting, to the base LLM, an entity-specific request; and
receiving, from the base LLM, the one or more differentiator outputs.

9. The system of claim 1, wherein encoding the contrast score into the differentiator profile comprises:
receiving an existing differentiator profile associated with the entity; and updating one or more categorical tags and one or more weighted relationships within the existing differentiator profile for each positioning signal.

10. The system of claim 1, wherein generating the contrast score for each positioning signal comprises:

computing a benefit score for each positioning signal based on the comparison between each positioning signal and the descriptive content; and filtering out contrast scores associated with a negative benefit score.

11. A method for Large Language Model (LLM) based differentiation, the method comprising:

receiving, by at least a processor, input data associated with an entity;

classifying, by the at least a processor, the input data to a descriptive class;

commanding, by the at least a processor, an adaptive web crawler to retrieve descriptive content associated with the descriptive class;

extracting, by the at least a processor, a plurality of positioning signals from the input data associated with the entity;

generating, by the at least a processor, a contrast score for each positioning signal of the plurality of positioning signals by comparing the plurality of positioning signals to the descriptive content;

encoding, by the at least a processor, the contrast score into a differentiator profile comprising at least one categorical tag and at least one weighted relationship for each positioning signal;

modifying, by the at least a processor, a generation behavior of a base LLM using the differentiator profile as a conditioning input; and generating, by the base LLM conditioned on the differentiator profile, one or more differentiator outputs.

12. The method of claim 11, wherein:

commanding the adaptive web crawler to retrieve the descriptive content comprises:

transforming the descriptive content into a plurality of descriptive embeddings within a shared feature space; and extracting the plurality of positioning signals from the input data associated with the entity comprises:

transforming the input data into a plurality of signal embeddings representing the entity in the shared feature space such that each positioning signal comprises a signal embedding within the shared feature space.

13. The method of claim 12, wherein generating the contrast score for each positioning signal comprises:

identifying a distance between each signal embedding and each descriptive embedding; and generating the contrast score based on the distance.

14. The method of claim 11, wherein:

classifying the input data to the descriptive class comprises:

applying a multi-label classifier configured to output a confidence vector for each descriptive class of a plurality of descriptive classes; and commanding the adaptive web crawler to retrieve the descriptive content comprises triggering one or more class-specific crawl policies for the adaptive web crawler based on the descriptive content.

15. The method of claim 11, the method further comprising:

generating, by the at least a processor, a resonance score indicative of a predicted response for each differentiator output of the one or more differentiator outputs; and displaying, by the at least a processor, the one or more differentiator outputs and the resonance score through a graphical user interface.

16. The method of claim 15, wherein generating the resonance score comprises generating the resonance score using a resonance machine learning model trained with training data comprising a plurality of historical differentiator outputs correlated to a plurality of historical responses.

17. The method of claim 11, wherein the input data comprises a meeting transcript.

18. The method of claim 11, wherein generating the one or more differentiator outputs comprises:

transmitting, to the base LLM, an entity-specific request; and receiving, from the base LLM, the one or more differentiator outputs.

19. The method of claim 11, wherein encoding the contrast score into the differentiator profile comprises:

receiving an existing differentiator profile associated with the entity; and updating one or more categorical tags and one or more weighted relationships within the existing differentiator profile for each positioning signal.

20. The method of claim 11, wherein generating the contrast score for each positioning signal comprises:

computing a benefit score for each positioning signal based on the comparison between each positioning signal and the descriptive content; and filtering out contrast scores associated with a negative benefit score.

* * * * *